(12) United States Patent
Atarius et al.

(10) Patent No.: US 10,532,739 B2
(45) Date of Patent: Jan. 14, 2020

(54) OFF-NETWORK CALL PRIORITY

(71) Applicant: Ofinno Technologies, LLC, Reston, VA (US)

(72) Inventors: Roozbeh Atarius, LaJolla, CA (US); Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/386,566

(22) Filed: Apr. 17, 2019

(65) Prior Publication Data

US 2019/0241179 A1 Aug. 8, 2019

Related U.S. Application Data

(63) Continuation of application No. 15/403,745, filed on Jan. 11, 2017, now Pat. No. 10,071,733.

(Continued)

(51) Int. Cl.
*G01C 22/00* (2006.01)
*B60W 30/09* (2012.01)
(Continued)

(52) U.S. Cl.
CPC ........... *B60W 30/09* (2013.01); *G01S 7/4817* (2013.01); *G01S 7/4876* (2013.01); *G01S 17/026* (2013.01); *G01S 17/10* (2013.01); *G01S 17/102* (2013.01); *G01S 17/42* (2013.01); *G01S 17/48* (2013.01); *G01S 17/93* (2013.01); *H04W 8/005* (2013.01);
(Continued)

(58) Field of Classification Search
CPC ............................. B60W 30/09; H04W 76/20
See application file for complete search history.

(56) References Cited

U.S. PATENT DOCUMENTS

| | | |
|---|---|---|
| 2003/0235184 A1 | 12/2003 | Dorenbosch et al. |
| 2016/0105291 A1 | 4/2016 | Anchan |

(Continued)

OTHER PUBLICATIONS

3GPP TS 22.179 V13.3.0 (Dec. 2015), Technical Specification, 3rd Generation Partnership Project; Technical Specification Group Services and System Aspects; Mission Critical Push to Talk (MCPTT) over LTE; Stage 1, (Release 13).

(Continued)

*Primary Examiner* — Adam M Alharbi
(74) *Attorney, Agent, or Firm* — David Grossman; Kavon Nasabzadeh; Philip Smith

(57) ABSTRACT

A first off-network wireless device discovers a second off-network wireless device and a third off-network wireless device. The first off-network wireless device transmits first media traffic employing a first session to the third off-network wireless device. The first off-network wireless device receives a floor request message from the second off-network wireless device. The floor request message comprises an organization field identifier and an organization identifier. The first off-network wireless device determines a call priority based on the organization field identifier and the organization identifier. Based on the call priority, transmission of the first media traffic to the third off-network wireless device is terminated. The first off-network wireless device starts transmission of second media traffic to the second off-network wireless device employing a second session.

20 Claims, 25 Drawing Sheets

Related U.S. Application Data

(60) Provisional application No. 62/294,734, filed on Feb. 12, 2016.

(51) Int. Cl.

| | | |
|---|---|---|
| *H04W 8/00* | (2009.01) | |
| *H04W 76/11* | (2018.01) | |
| *H04W 76/20* | (2018.01) | |
| *H04W 76/50* | (2018.01) | |
| *G01S 7/481* | (2006.01) | |
| *G01S 7/487* | (2006.01) | |
| *G01S 17/02* | (2006.01) | |
| *G01S 17/10* | (2006.01) | |
| *G01S 17/42* | (2006.01) | |
| *G01S 17/48* | (2006.01) | |
| *G01S 17/93* | (2006.01) | |
| *H04W 4/80* | (2018.01) | |
| *H04W 88/04* | (2009.01) | |
| *H04W 76/40* | (2018.01) | |
| *H04W 76/14* | (2018.01) | |

(52) U.S. Cl.
CPC ............ *H04W 76/11* (2018.02); *H04W 76/20* (2018.02); *H04W 76/50* (2018.02); *B60W 2420/00* (2013.01); *B60W 2420/52* (2013.01); *G01S 17/023* (2013.01); *H04W 4/80* (2018.02); *H04W 76/14* (2018.02); *H04W 76/40* (2018.02); *H04W 88/04* (2013.01)

(56) References Cited

U.S. PATENT DOCUMENTS

| | | |
|---|---|---|
| 2016/0105500 A1 | 4/2016 | Anchan et al. |
| 2016/0283996 A1 | 9/2016 | Bakhshaie et al. |
| 2016/0381720 A1 | 12/2016 | Baek et al. |
| 2017/0257751 A1 | 9/2017 | Atarius et al. |
| 2017/0257876 A1 | 9/2017 | Loehr et al. |
| 2017/0289776 A1 | 10/2017 | Kim et al. |
| 2017/0353516 A1* | 12/2017 | Gordon .............. H04N 21/8456 |
| 2017/0359186 A1* | 12/2017 | Atarius ............... H04L 12/1407 |
| 2018/0077208 A1 | 3/2018 | Li et al. |
| 2018/0234465 A1 | 8/2018 | Kim et al. |
| 2018/0255499 A1 | 9/2018 | Loehr et al. |
| 2019/0215724 A1* | 7/2019 | Talebi Fard .......... H04L 43/028 |

OTHER PUBLICATIONS

3GPP TS 24.379 V1.2.0 (Feb. 2016), Technical Specification, 3rd Generation Partnership Project; Technical Specification Group Core Networks and Terminals; Mission Critical Push to Talk (MCPTT) call controlProtocol specification, (Release 13).

C1-161109, 3GPP TSG-CT WG1 Meeting #96, Jeju (Korea), Feb. 15-19, 2016, Source: Ericsson, Title: Pseudo—CR on New draft-holmberg-dispatch-mcptt-rp-namespace-00.

C1-161206 was C1-161070,3GPP TSG-CT WG1 Meeting #96, Jeju, Korea, Feb. 15-19, 2016, Source: Samsung, Title: Off-network—Call merge based on priorities.

C1-161208 was C1-161072, 3GPP TSG-CT WG1 Meeting #96, Jeju, Korea, Feb. 15-19, 2016, Source: Samsung, Title: Off-network—Initializing call type control machine.

C1-161210 was C1-161074, 3GPP TSG-CT WG1 Meeting #96, Jeju, Korea, Feb. 15-19, 2016, Source: Samsung, Title: Off-network—Timer value calculation after probe.

C1-161234, was C1-161075, 3GPP TSG-CT WG1 Meeting #96, Jeju, Korea, Feb. 15-19, 2016, Source: Samsung, Title: Off-network—SDP updates.

C1-161361 rev of C1-161122, 3GPP TSG-CT WG1 Meeting #96 , Jeju (Korea), Feb. 15-19, 2016, Source: Samsung, Title: Pseudo—CR on Routing.

C1-161438 was C1-161204, 3GPP TSG-CT WG1 Meeting #96, Jeju (Korea), Feb. 15-19, 2016, Source: Samsung, Title: Off-network—Call control timers and counters.

C1-161439 was C1-161205, 3GPP TSG-CT WG1 Meeting #96, Jeju, Korea, Feb. 15-19, 2016, Source: Samsung, Title: Off-network—Emergency Alert.

C1-161441 was C1-161211, 3GPP TSG-CT WG1 Meeting #96, Jeju, Korea, Feb. 15-19, 2016, Source: Samsung, Title: Off-network—Editorial.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Floor Priority |Floor Priority |Floor Priority | Organization  |
|field ID value |Length value   |Value          | value         |
+-+-+-+-+-+-+-+-+-+-+-+-+-+-+-+-+-+-+-+-+-+-+-+-+-+-+-+-+-+-+-+-+
```

FIG. 23A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Floor Priority |Floor Priority |Floor Priority |spare          |
|field ID value |Length value   |Value          |               |
+-+-+-+-+-+-+-+-+-+-+-+-+-+-+-+-+-+-+-+-+-+-+-+-+-+-+-+-+-+-+-+-+
|Organization   |Organization   |Organization   | spare         |
|field ID value |Length value   |Value          |               |
+-+-+-+-+-+-+-+-+-+-+-+-+-+-+-+-+-+-+-+-+-+-+-+-+-+-+-+-+-+-+-+-+
```

OFF-NETWORK CALL PRIORITY

CROSS-REFERENCE TO RELATED APPLICATIONS

This application is a continuation of U.S. patent application Ser. No. 15/430,745, filed Feb. 13, 2017, which claims the benefit of U.S. Provisional Application No. 62/294,734, filed Feb. 12, 2016, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 23A is a diagram of an example floor control message tagged with an associated organization value as per an aspect of an embodiment.

FIG. 23B is a diagram of an example floor control messages comprising an optional parameter as per an aspect of an embodiment.

DETAILED DESCRIPTION OF EMBODIMENTS

Figure 1:
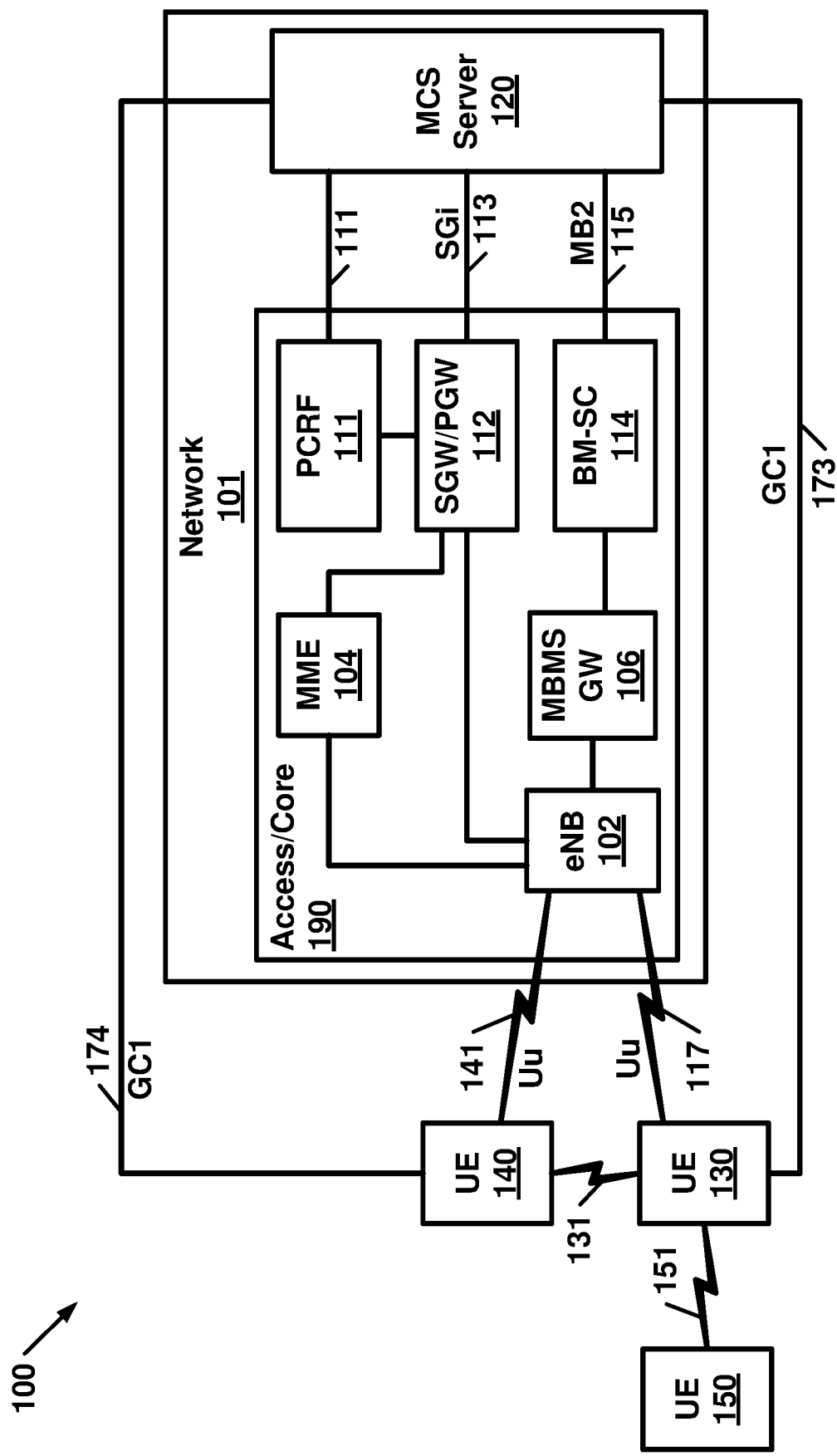
FIG. 1 illustrates a block diagram of an example system 100 according to various embodiments.

Example embodiments are generally directed to critical communication service (e.g., A) that may involve use of wireless mobile telecommunication cellular and/or wireless mobile broadband technologies. Wireless mobile broadband technologies may include wireless technologies suitable for use with wireless devices and/or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny, and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3 GPP Rel. 8, 9, 10 or 11 of LTE/System Architecture Evolution (SAE), and so forth. The examples are not limited in this context. In this disclosure, the term "critical" is being employed as a term of art as disclosed, for example, in various communication specifications and is therefore not intended to otherwise limit the scope of the claims.

By way of example and not limitation, various examples may be described with specific reference to various 3 GPP radio access network (RAN) standards, such as the 3 GPP Universal Terrestrial Radio Access Network (UTRAN), the 3 GPP Evolved Universal Terrestrial Radio Access Network (E-UTRAN) and 3GPP's suite of UMTS and LTE/LTE-Advanced Technical Specifications (in case of LTE/LTE-Advanced collectively "3GPP LTE Specifications" according to the 36 Series of Technical Specifications), and IEEE 802.16 standards, such as, for example, the IEEE 802.16-2009 standard and current third revision to IEEE 802.16 referred to as "802.16 Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for WirelessMAN-Advanced Air Interface for Broadband Wireless Access Systems, Enhancements to Support Machine-to-Machine Applications" (collectively "IEEE 802.16 Standards"), and any drafts, revisions or variants of the 3 GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, mission critical service (MCS) may support an enhanced mission critical push-to-talk (MCPTT) service, an enhanced mission critical video (MCVIDEO) service, an enhanced mission critical data/message (MCDATA) service, and/or the like. An MCS service may be suitable for mission critical scenarios and may be based upon 3GPP EPS services. MCS may typically be a session initiation protocol (SIP) based service that may be provided via a centralized MCS server residing in a network (e.g., a 3GPP EPS network). The MCS server may be an IP Multimedia Subsystem (IMS) application server, but the MCS server may also be a non-IMS based SIP server. User equipment (UEs) may directly attach to the network to receive critical communication services from an MCS server. Some UEs may also utilize Proximity Services (ProSe) capabilities to indirectly attach to the network through a relay UE. UEs utilizing ProSe capabilities may be outside of a coverage area of the network and may be referred to as remote UEs.

FIG. 1 illustrates a block diagram of an example system 100 according to various embodiments. According to an embodiment, elements of system 100 may be arranged for providing critical communication services to one or more UEs (e.g. UE 130, UE 140 and UE 150). These critical communication services may comprise MCS services as specified in, for example, 3GPP technical specification (TS) 22.179, entitled "Technical Specification Group Services and System Aspects; MCS over LTE, Stage 1", Release 13, V13.0.1, published in January of 2015, and/or previous or subsequent releases or versions (hereinafter referred to as 3GPP TS 22.179). For example, as shown in FIG. 1, a network 101 may include an MCS server 120 that may serve as centralized server to enable network 101 to provide a SIP-based critical communication service to UEs 130, 140 or 150. MCS server 120 may be arranged as, for example, an IMS application server or a non-IMS based SIP server.

According to an embodiment, access/core 190 may comprise elements of network 101 typically associated with 3GPP E-UTRAN access and 3GPP E-UTRAN core elements. For example, a UE such as UE 130 may gain access to network 101 via Uu 117 coupled to evolved Node B (eNB) 102. Also, as shown in FIG. 1, MCS server 120 may couple to various access/core 190 elements. For example, MCS server 120 may couple to a policy and charging rules function (PCRF) 111 via 111. Link 111 may represent an Rx interface reference point. MCS server 120 may also couple to a serving gateway/packet data gateway (SGW/PWG) 112 via SGi 113. SGi 113 may represent an SGi interface reference point. (According to various embodiments, an interface may comprise and/or be a reference point). MCS server 120 may also couple to a broadcast/multicast-service center (BM-SC) 114 via MB2 115. MB2 115 may represent an MB2 reference point.

Mobile management entity (MME) 104 and multimedia broadcast/multicast service gateway (MBMS GW) 106 may provide core 3 GPP E-UTRAN services to MCS server 120 and/or UEs 130, 140 and 150 to facilitate network 101 in providing critical communication services.

According to an embodiment, UE 130 may attach directly to MCS server 120. UE 130 may comprise an MCS client that may be arranged as a SIP-based MCS client for communication with MCS server 120. MCS server 120 may be arranged as a type of group communication service application server (GCS AS) and GC1 173 may represent a GC1 reference point through which MCS server 120 couples with MCS client at UE 130.

According to an embodiment, UEs out of network coverage of network 101 may still be able to obtain critical communication service by coupling through UEs serving as UE-to-network relays such as UE 130. For example, UE 150 may be able to indirectly couple to MCS server 120 via a first link 151 between UE 150 and UE 130 and through a second link (GC1 173) between UE 130 and MCS server 120.

According to an embodiment, UE 130 acting as an UE-to-network relay may relay traffic from MCS server 120 for authorized UEs and/or authorized groups of UEs (e.g., belonging to an MCS group). UE 130 may act as an UE-to-network relay for groups of which it is not a member. As such, a relay UE, such as UE 130, may comprise logic and/or features to enable the relay UE to act as a node between an MCS server and a remote UE such as UE 150 via link 151.

According to an embodiment, critical communication content may be delivered to directly coupled UEs such as UEs 130 or 140 in either a unicast mode (e.g., via EPS bearers) and/or in multicast mode (e.g., via evolved MBMS (eMBMS) bearers). Use of eMBMS bearers may be justified in cases where a sufficient number of UEs are physically located within a same coverage area or cell. When the number of UEs in a cell is low, unicast delivery via EPS may be more efficient compared to eMBMS or multicast delivery. MCS server 120 may comprise logic and/or features capable of monitoring the number of UEs in a cell and then adjust a delivery mode accordingly.

According to an embodiment, as part of ProSe capabilities, UE 130 and UE 150 may establish a direct link 151. UE 130 may couple to MCS server 120 through GC1 173. Alternatively, UE 150 may couple to MCS server 120 via: (1) link 151 between UE 150 and UE 130; (2) link 131 between UE 130 and UE 140; and (3) GCI 174 between UE 140 to MCS Server 120. Establishment of the direct link may comprise relay discovery, mutual authentication and IP address assignment. Establishment of the direct link may comprise UE 130 and UE 150 setting up a wireless local area network (WLAN) direct connection. The WLAN direct connection may be arranged to operate according to Ethernet wireless standards (including progenies and variants) associated with the IEEE Standard for Information technology-Telecommunications and information exchange between systems—Local and metropolitan area networks—Specific requirements Part 1 1: WLAN Media Access Controller (MAC) and Physical Layer (PHY) Specifications, published March 2012, and/or later versions of this standard ("IEEE 802.11"). According to an embodiment, following the same logic as mentioned above for MCS server 120 selecting a unicast or multicast delivery mode, logic and/or features of a relay UE such as UE 130 and/or 140 may choose a unicast or multicast delivery mode to relay information (e.g., critical communication content) to one or more remote UEs such as UE 150 and/or each other.

A direct link between UEs 140 and 130 may be established via, for example, a PC5 interface (e.g. 131). The PC5 interface may be selectively chosen to communicate information. It may be possible to use unicast delivery via the LTE-Uu interface.

Concepts expressed herein may be implemented in connection with cellular telephones and/or other types of User Equipment (UE) used on communication networks, and particularly wireless communication networks. Described below are one or more example communication networks and related equipment within which at least some of the aspects of the herein described concepts may be implemented.

Figure 2:
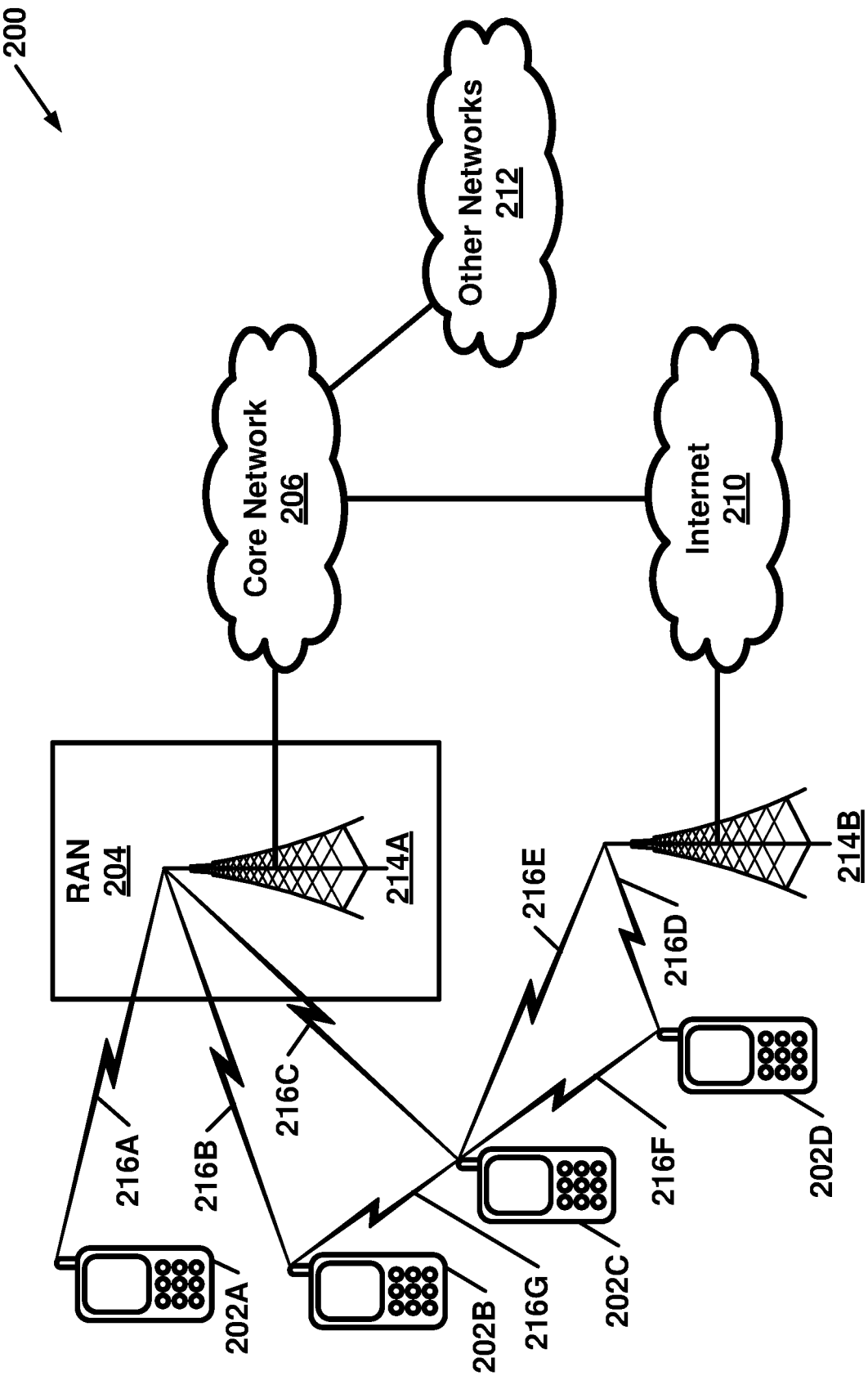
FIG. 2 is a system diagram of an example communications system in which one or more disclosed embodiments may be implemented.

FIG. 2 is a diagram of an example communications system 200 in which one or more disclosed embodiments may be implemented. The communications system 200 may comprise a multiple access system configured to provide content, such as voice, data, video, messaging, broadcast, etc., to multiple wireless users. The communications system 200 may enable multiple wireless users to access such content through the sharing of system resources, including, for example, wireless bandwidth. For example, communications systems 200 may employ one or more channel access processes, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 2, the communications system 200 may comprise wireless transmit/receive units (WTRUs) 202A, 202B, 202C, 202D, a radio access network (RAN) 204, a core network 206, the Internet 210, and/or other networks 212. It will be appreciated that the disclosed embodiments contemplate various numbers of WTRUs, base stations, networks, and/or network elements. Each of the WTRUs 202A, 202B, 202C, 202D may be configured to operate and/or communicate in a wireless environment. By way of example, WTRUs 202A, 202B, 202C, 202D may be configured to transmit and/or receive wireless signals and may comprise user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, combinations thereof, and/or the like.

The communications systems 200 may also comprise a base station 214A and/or base station 214B. Each of the base stations 214A, 214B may be a type of device configured to wirelessly interface with at least one of the WTRUs 202A, 202B, 202C, 202D to facilitate access to one or more communication networks, such as core network 206, Internet 210 and/or networks 212. By way of example, base stations 214A and/or 214B may comprise a base transceiver station (BTS), a Node-B, an eNode B, a Home Node B, a Home eNode B, a site controller, an access point (AP), a wireless router, combinations thereof, and/or the like. While base stations 214A and 214B are each depicted as a single element, it will be appreciated that base stations 214A and 214B may comprise various numbers of interconnected base stations and/or network elements.

As illustrated, base station 214A may be a part of the RAN 204, which may also comprise other base stations and/or network elements (not shown), such as, for example, a base station controller (BSC), a radio network controller (RNC), relay nodes, combinations thereof, and/or the like. Base station 214A and/or the base station 214B may be configured to transmit and/or receive wireless signals within a particular geographic region, which may be referred to as a cell (not shown). The cell may be further divided into cell sectors. For example, the cell associated with the base station 214A may be divided into three sectors. Thus, according to an embodiment, base station 214A may comprise three transceivers, i.e., one for each sector of the cell. According to an embodiment, base station 214A may employ multiple-input multiple output (MIMO) technology and, therefore, may utilize multiple transceivers for each sector of the cell.

Base stations 214A and/or 214B may communicate with one or more of the WTRUs (e.g. 202A, 202B, 202C, and 202D) over an air interface (e.g. 216A, 216B, (216C and/or 216E), and 216D, respectively), which may comprise a wireless communication link (e.g., radio frequency (RF), microwave, infrared (IR), ultraviolet (UV), visible light, etc.). An air interface (e.g. 216A, 216B, 216C, 216D, 216E, 216F and 216G) may be established employing a suitable radio access technology (RAT).

More specifically, as noted above, communications system 200 may comprise a multiple access system and may employ one or more channel access schemes, such as CDMA, TDMA, FDMA, OFDMA, SC-FDMA, combinations thereof, and/or the like. For example, base station 214A in the RAN 204 and WTRUs 202A, 202B, and 202C may implement a radio technology such as Universal Mobile Telecommunications System (UMTS) Terrestrial Radio Access (UTRA), which may establish air interface (e.g. 202A, 202B, and 202C) employing wideband CDMA (WCDMA). WCDMA may comprise communication protocols such as High-Speed Packet Access (HSPA) and/or Evolved HSPA (HSPA+). HSPA may comprise High-Speed Downlink Packet Access (HSDPA) and/or High-Speed Uplink Packet Access (HSUPA).

According to an embodiment, base station 214A and WTRUs 202A, 202B, 202C may implement a radio technology such as Evolved UMTS Terrestrial Radio Access (E-UTRA), which may establish air interface (e.g. 216A, 216B, and 216C, respectively) employing Long Term Evolution (LTE) and/or LTE-Advanced (LTE-A).

According to an embodiment, base station 214A and WTRUs 202A, 202B, 202C may implement radio technologies such as IEEE 802.16 (i.e., Worldwide Interoperability for Microwave Access (WiMAX)), CDMA2000, CDMA2000 IX, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), combinations thereof, and/or the like.

Base station 214B in FIG. 2 may comprise a wireless router, Home Node B, Home eNode B, or an access point, for example, and may utilize a RAT for facilitating wireless connectivity in a localized area, such as a place of business, a home, a vehicle, a campus, combinations thereof, and/or the like. According to an embodiment, base station 214B and WTRUs 202C, 202D may implement a radio technology such as IEEE 802.11 to establish a wireless local area network (WLAN). According to an embodiment, base station 214B and WTRUs 202C and 202D may implement a radio technology such as IEEE 802.15 to establish a wireless personal area network (WPAN). According to an embodiment, base station 214B and WTRUs 202C and 202D may utilize a cellular-based RAT (e.g., WCDMA, CDMA2000, GSM, LTE, LTE-A, etc.) to establish a picocell or femtocell. As shown in FIG. 2, base station 214B may have a direct connection to the Internet 210. Thus, base station 214B may not be required to access the Internet 210 via the core network 206.

The RAN 204 may be in communication with the core network 206, which may be a type of network configured to provide voice, data, applications, and/or voice over internet protocol (VoIP) services to one or more of the WTRUs 202A, 202B, 202C, and 202D. For example, core network 206 may provide call control, billing services, mobile location-based services, pre-paid calling, Internet connectivity, video distribution, etc., and/or perform high-level security functions, such as user authentication. Although not shown in FIG. 2, it anticipated that according to an embodiment, RAN 204 and/or core network 206 may be in direct or indirect communication with other RANs that employ the same RAT as the RAN 204 or a different RAT. For example, in addition to being connected to the RAN 204, which may utilize an E-UTRA radio technology, the core network 206 may also be in communication with another RAN (not shown).

Core network 206 may serve as a gateway for the WTRUs 202A, 202B, 202C and/or 202D to access the PSTN 208, the Internet 210 and/or other networks 212. The Internet 210 may comprise a global system of interconnected computer networks and devices that use common communication protocols, such as the transmission control protocol (TCP), user datagram protocol (UDP) and the internet protocol (IP) in the TCP/IP internet protocol suite. Other networks 212 may comprise wired and/or wireless communications networks owned and/or operated by other service providers. For example, the networks 212 may comprise another core network connected to one or more RANs, which may employ the same RAT as the RAN 204 or a different RAT.

Some or all of the WTRUs 202A, 202B, 202C, and 202D in the communications system 200 may comprise multi-mode capabilities (i.e., the WTRUs 202A, 202B, 202C, and 202D may comprise multiple transceivers for communicating with different wireless networks over different wireless links). For example, example WTRU 300 shown in FIG. 3 may be configured to communicate with base station 214A, which may employ a cellular-based radio technology, and with the base station 214B, which may employ an IEEE 802 radio technology.

Figure 3:
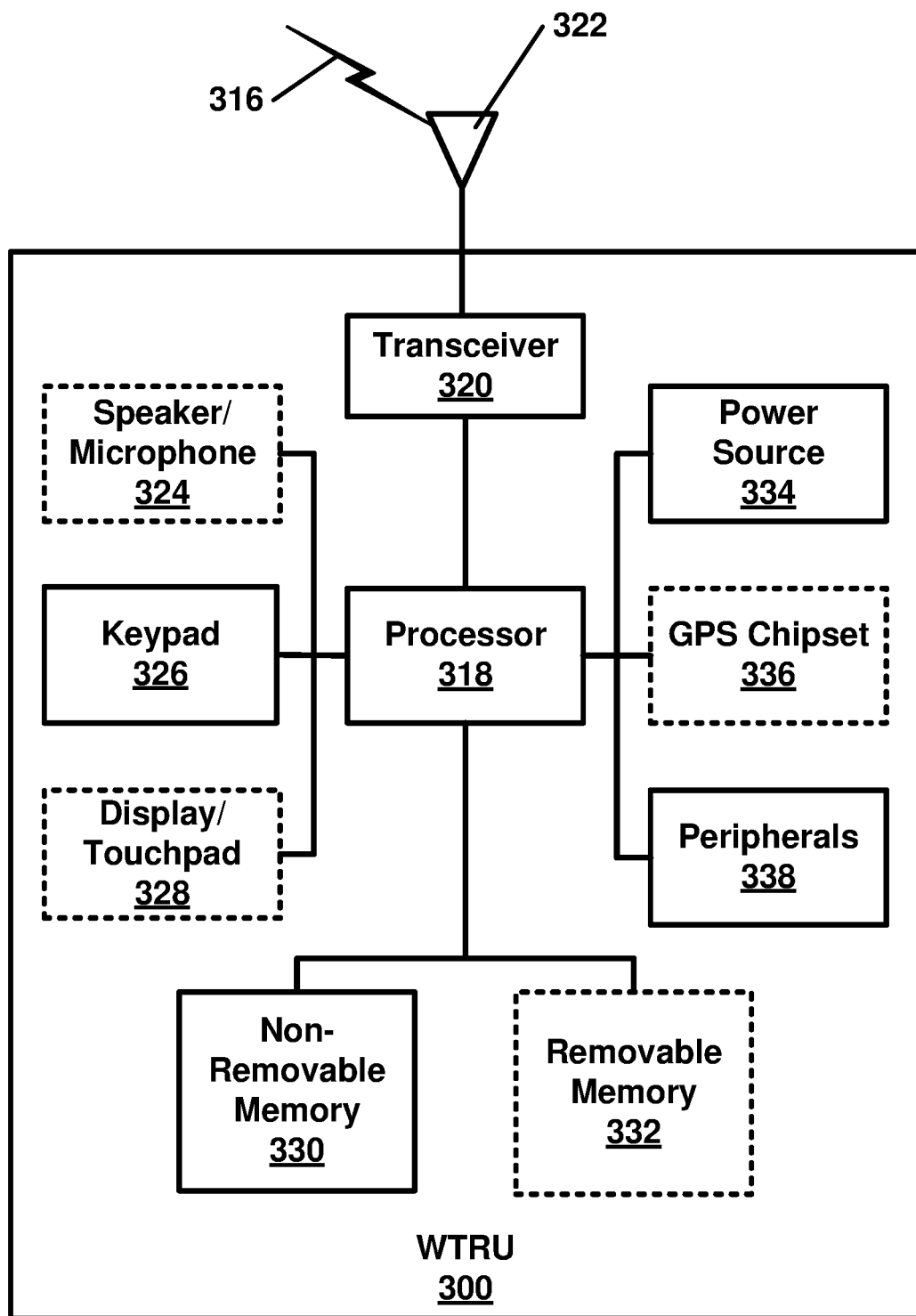
FIG. 3 is a system diagram of an example wireless transmit/receive unit (WTRU) as per an aspect of an embodiment.

FIG. 3 is a system diagram of an example WTRU 300. As shown in FIG. 3, example WTRU 300 may comprise a processor 318, a transceiver 320, a transmit/receive element 322, a speaker/microphone 324, a keypad 326, a display/touchpad 328, non-removable memory 330, removable memory 332, a power source 334, a global positioning system (GPS) chipset 336, and other peripherals 338. It will be appreciated that the WTRU 300 may comprise a sub-combination of the foregoing elements while remaining consistent with an embodiment. For example, an WRTU 300 embodiment may be implemented without one or more of the dashed elements 324, 328, 336 and/or 332.

The processor 318 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 318 may perform signal coding, data processing, power control, input/output processing and/or other functionality that enables example WTRU 300 to operate in a wireless environment. Processor 318 may be coupled to the transceiver 320, which may be coupled to the transmit/receive element 322. While FIG. 3 depicts elements such as, for example, processor 318 and transceiver 320 as separate components, it will be appreciated that the elements such as processor 318 and the transceiver 320 may be integrated together in an electronic package and/or chip. While FIG. 3 depicts elements such as, for example, processor 318 and transceiver 320 as individual components, it will be appreciated that the elements such as processor 318 and the transceiver 320 may be implemented as a collection of other elements.

The transmit/receive element 322 may be configured to transmit signals to, or receive signals from, a base station (e.g., the base station 214A) over the air interface 316. For example, in an embodiment, the transmit/receive element 322 may be an antenna configured to transmit and/or receive RF signals. According to an embodiment, the transmit/receive element 322 may be an emitter/detector configured to transmit and/or receive IR, UV, or visible light signals, for example. According to an embodiment, the transmit/receive element 322 may be configured to transmit and receive both RF and light signals. It will be appreciated that the transmit/receive element 322 may be configured to transmit and/or receive any combination of wireless signals.

In addition, although the transmit/receive element 322 is depicted in FIG. 3 as a single element, example WTRU 300 may comprise any number of transmit/receive elements 322. More specifically, example WTRU 300 may employ MIMO technology. Thus, according to an embodiment, example WTRU 300 may comprise two or more transmit/receive elements 322 (e.g., multiple antennas) for transmitting and receiving wireless signals over the air interface 316.

Transceiver 320 may be configured to modulate signals that are to be transmitted by transmit/receive element 322 and to demodulate signals received by transmit/receive element 322. As noted above, example WTRU 300 may have multi-mode capabilities. Thus, the transceiver 320 may comprise multiple transceivers for enabling example WTRU 300 to communicate via multiple RATs, such as E-UTRA and IEEE 802.11, for example.

Processor 318 of example WTRU 300 may be coupled to, and may receive user input data from, for example, the speaker/microphone 324, the keypad 326 and/or the display/touchpad 328 (e.g., a liquid crystal display (LCD) display unit or organic light-emitting diode (OLED) display unit). Processor 318 may output user data to, for example, the speaker/microphone 324, the keypad 326 and/or the display/touchpad 328. Processor 318 may access information from, and store data in, a type of suitable memory, such as the non-removable memory 330 and/or the removable memory 332. The non-removable memory 330 may comprise random-access memory (RAM), read-only memory (ROM), a hard disk, and/or other type of memory storage device. The removable memory 332 may comprise a subscriber identity module (SIM) card, a memory stick, a secure digital (SD) memory card, and/or the like. According to an embodiment, processor 318 may access information from, and store data in, memory that is not physically located on example WTRU 300, such as on a server or a home computer (not shown).

Processor 318 may receive power from the power source 334, and may be configured to distribute and/or control the power to the other components in example WTRU 300. Power source 334 may be a suitable device for powering example WTRU 300. For example, power source 334 may comprise one or more dry cell batteries (e.g., nickel-cadmium (NiCd), nickel-zinc (NiZn), nickel metal hydride (NiMH), lithium-ion (Li-ion), etc.), solar cells, fuel cells, combinations thereof, and/or the like.

Processor 318 may also be coupled to GPS chipset 336, which may be configured to provide location information (e.g., longitude and latitude) regarding the current location of example WTRU 300. In addition to, and/or in lieu of, the information from the GPS chipset 336, example WTRU 300 may receive location information over the air interface 316 from a base station (e.g., base stations 214A, 214B) and/or determine a location based on the timing of the signals being received from two or more nearby base stations. It will be appreciated that the WTRU 300 may acquire location information by way of other suitable location-determination process(es) while remaining consistent with an embodiment.

Processor 318 may further be coupled to other peripherals 338, which may comprise one or more software and/or hardware modules that provide additional features, functionality, and/or wired or wireless connectivity. For example, peripherals 338 may comprise, for example, an accelerometer, an e-compass, a satellite transceiver, a digital camera (for photographs or video), a universal serial bus (USB) port, a vibration device, a television transceiver, a hands free headset, a Bluetooth™ module, a frequency modulated (FM) radio unit, a digital music player, a media player, a video game player module, an Internet browser, a combination thereof, and/or the like.

Figure 4:
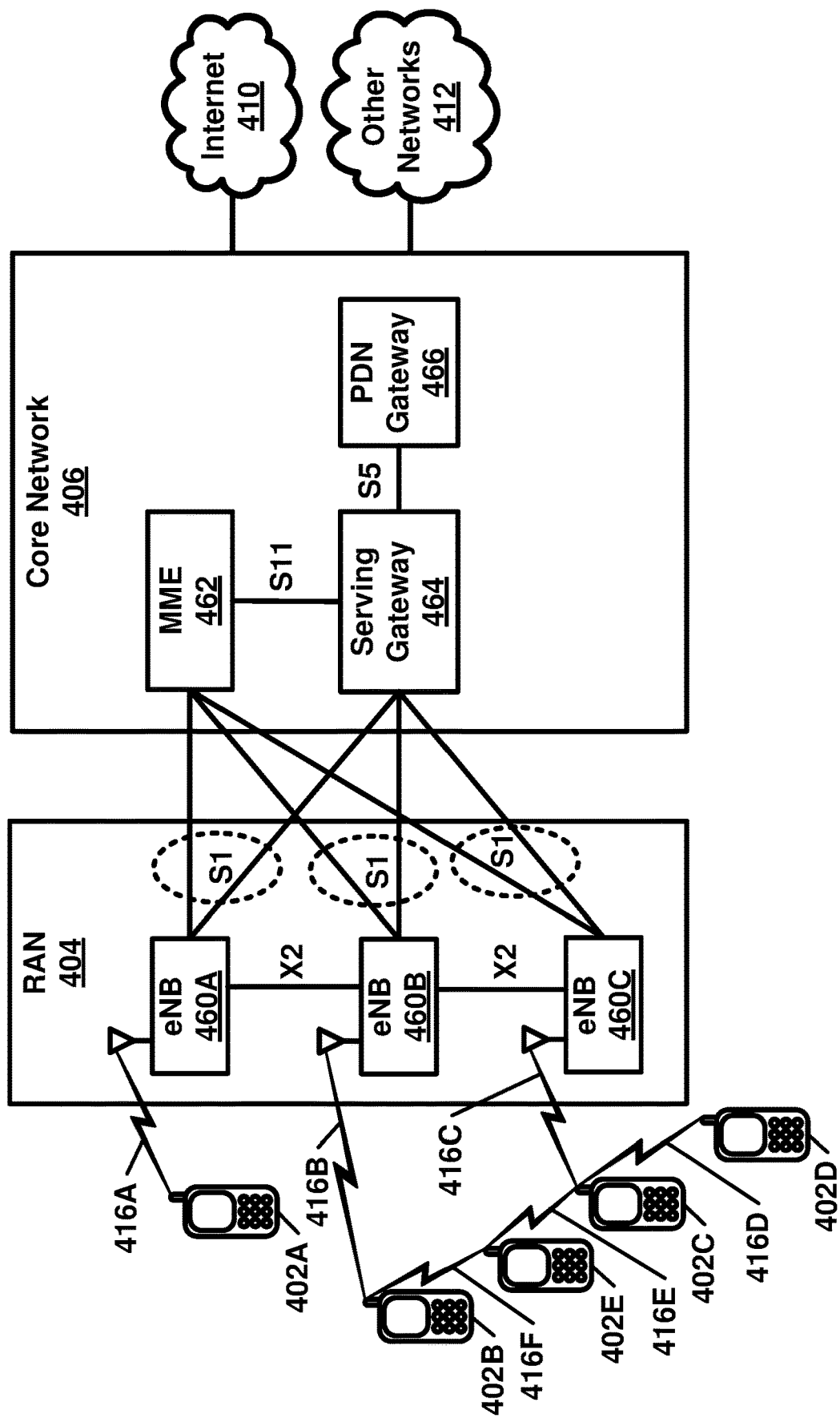
FIG. 4 is a system diagram of an example radio access network and core network as per an aspect of an embodiment.

FIG. 4 is a system diagram of an example communications system comprising an example RAN 404 and an example core network 406. This example communications system is disclosed for example purposes. Variations in communications systems may be implemented within the scope of the embodiment. In this example embodiment, RAN 404 may employ an E-UTRA radio technology to communicate with the WTRUs 402A, 402B and/or 402C over air interfaces 416A, 416b and/or 416C respectively. RAN 404 may be in communication with the core network 406.

Example RAN 404 may comprise eNBs 460A, 460B and/or 460C, though it will be appreciated that the RAN 404 may comprise various numbered of eNBs while remaining consistent with an embodiment. The eNBs 460A, 460B and/or 460C may each comprise one or more transceivers for communicating with the WTRUs 402A, 402B and/or 402C over air interface 416A, 416B and/or 416C respectively. In an embodiment, the eNBs 460A, 460B and/or 460C may implement MIMO technology. Thus, the eNB 460A, for example, may use multiple antennas to transmit wireless signals to, and receive wireless signals from, example WTRUs 402A.

Some WTRUs may be configured to communicate with each other directly. For example, as illustrated, WTRU 402E may be configured to communicate with example WTRU 402B and/or example WTRU 402C over the air interfaces 416F and/or 416E, respectively. Similarly, example WTRU 402D may be configured to communicate with example WTRU 402C over the air interfaces 416D.

Each of the eNBs 460A, 460B, and/or 460C may be associated with a particular cell (not shown) and may be configured to handle radio resource management decisions, handover decisions, scheduling of users in the uplink and/or downlink, and the like. As shown in FIG. 4, the eNBs 460A, 460B and/or 460C may communicate with one another over, for example: an X2 interface, a reference point, and/or the like.

Example core network 406 shown in FIG. 4 may comprise a mobility management gateway (MME) 462, a serving gateway 464, a packet data network (PDN) gateway 466, and/or the like. While each of the foregoing elements are depicted as part of the core network 406, it will be appreciated that various elements operating in a core network (e.g. 406) may be owned and/or operated by an entity other than the core network operator.

The MME 462 may be connected to each of the eNBs 460A, 460B, 460C in RAN 404 via an S1 interface, a reference point, and/or the like and may serve as a control node. For example, the MME 462 may be responsible for authenticating users of the WTRUs 402A, 402B, 402C, 402D and/or 402E, bearer activation/deactivation, selecting a particular serving gateway during an initial attach of the WTRUs 402A, 402B, 402C, 402D and/or 402E, and/or the like. The MME 462 may also provide a control plane function for switching between the RAN 404 and other RANs (not shown) that employ other radio technologies, such as, for example, GSM and/or WCDMA.

Serving gateway 464 may be connected to each of the eNode Bs 460A, 460B and/or 460C in the RAN 404 via an S1 interface, a reference point, and/or the like. The serving gateway 464 may generally route and forward user data packets to and from the WTRUs 402 a, 402B and/or 402C. The serving gateway 464 may also perform other functions, such as anchoring user planes during inter-eNode B handovers, triggering paging when downlink data is available for the WTRUs 402A, 402B and/or 402C, managing and storing contexts of the WTRUs 402A, 402B and/or 402C, and/or the like.

The serving gateway 464 may also be connected to the PDN gateway 466, which may provide the WTRUs 402a, 402B and/or 402C with access to packet-switched networks, such as the Internet 410, to facilitate communications between the WTRUs 402A, 402B and/or 402C and IP-enabled devices.

Example core network 406 may facilitate communications with other networks. For example, core network 406 may provide the WTRUs 402A, 402B and 402C with access to circuit-switched networks to facilitate communications between the WTRUs 402A, 402B, 402C and traditional land-line communications devices. For example, the core network 406 may comprise, and/or may communicate with, an IP gateway (e.g., an IP multimedia subsystem (IMS) server) that serves as an interface between the core network 406 and a PSTN. In addition, the core network 406 may provide the WTRUs 402A, 402B, 402C with access to the networks 412, which may comprise other wired or wireless networks that are owned and/or operated by other service providers.

Figure 5:
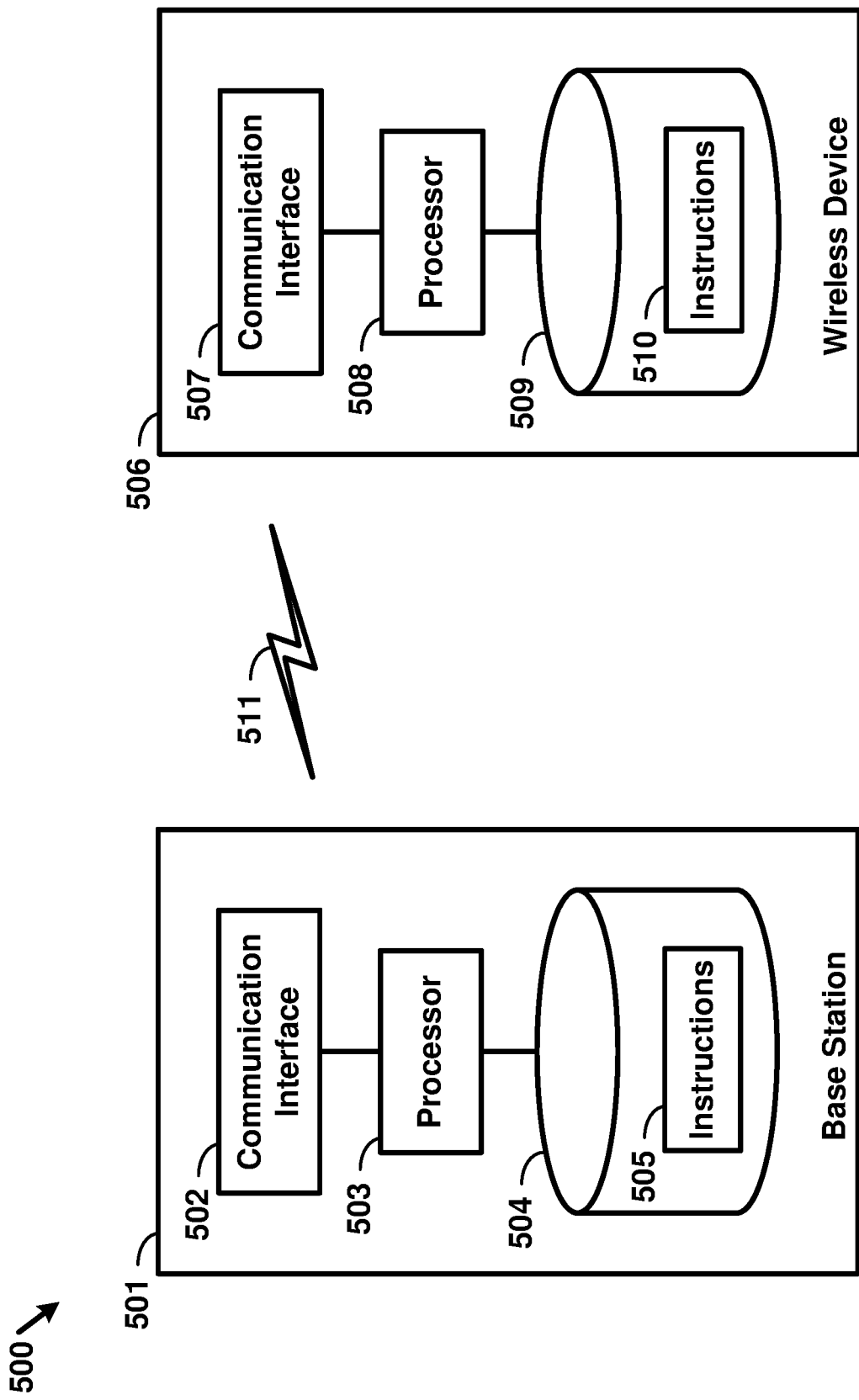
FIG. 5 is a block diagram of a base station and a wireless device as per an aspect of an embodiment.

FIG. 5 is an example block diagram of a base station 501 and a wireless device 506, as per an aspect of an embodiment of the present invention. A communication network 500 may comprise at least one base station 501 and at least one wireless device 506. The base station 501 may comprise at least one communication interface 502, at least one processor 503, and at least one set of program code instructions 505 stored in non-transitory memory 504 and executable by the at least one processor 503. The wireless device 506 may comprise at least one communication interface 507, at least one processor 508, and at least one set of program code instructions 510 stored in non-transitory memory 509 and executable by the at least one processor 508. Communication interface 502 in base station 501 may be configured to engage in communication with communication interface 507 in wireless device 506 via a communication path that comprises at least one wireless link 511. Wireless link 511 may be a bi-directional link. Communication interface 507 in wireless device 506 may also be configured to engage in a communication with communication interface 502 in base station 501. Base station 501 and wireless device 506 may be configured to send and receive data over wireless link 511 using multiple frequency carriers. According to some of the various aspects of embodiments, transceiver(s) may be employed. A transceiver is a device that comprises both a transmitter and receiver. Transceivers may be employed in devices such as wireless devices, base stations, relay nodes, and/or the like.

An interface may be a hardware interface, a firmware interface, a software interface, and/or a combination thereof. The hardware interface may comprise connectors, wires, electronic devices such as drivers, amplifiers, and/or the like. A software interface may comprise code stored in a memory device to implement protocol(s), protocol layers, communication drivers, device drivers, combinations thereof, and/or the like. A firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may comprise a multitude of base stations, providing a user plane PDCP/RLC/MAC/PHY and control plane (RRC) protocol terminations towards the wireless device. The base station(s) may be interconnected with other base station(s) (e.g. employing an X2 interface, reference point, and/or the like). The base stations may also be connected employing, for example, an S1 interface to an EPC. For example, the base stations may be interconnected to the MME employing the S1-MME interface, reference point, and/or the like and to the Serving Gateway (S-G) employing the S1-U reference point. The S1 interface, reference point, and/or the like may support a many-to-many relation between MMEs/Serving Gateways and base stations. A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

In order to set up a session for a mission critical service (MCS), where the mission critical service may be mission critical push-to-talk (MCPTT), the MCS UEs affiliated to MCS groups may first discover each other. This discovery may be a restricted discovery since MCS is a public safety feature. In the restricted discovery, the discoverer UEs and discoveree UEs may be authorized by being pre-provisioned with one or more parameters for the discovery procedure.

Examples for ProSe direct discovery methods are Model A and Model B.

Model A may include the following examples two roles for the ProSe-enabled UEs that are participating in ProSe Direct Discovery: Announcing UE: a) The UE announces certain information that may be used by UEs in proximity that have permission to discover. b) Monitoring UE: The UE that monitors certain information of interest in proximity of announcing UEs.

In Model A the announcing UE may broadcast discovery messages at discovery intervals (e.g. pre-defined intervals) and the monitoring UEs that are interested in these messages may read them and may process them. In an example, this model may be equivalent to "I am here" since the announcing UE may broadcast information about itself e.g. its restricted ProSe application code in the discovery message.

The UE may act as "announcing UE" in the carrier frequency signaled by the serving PLMN when using Model A mode. The UE may act as a "monitoring" UE in the resources of the serving PLMN and Local PLMNs, when using Model A mode. When inter-PLMN discovery transmission is supported, the carrier frequency may be operated by a PLMN other than the serving PLMN. Open and/or restricted discovery types may be supported by Model A.

Model B, when restricted discovery type is used, includes the following examples two roles for the ProSe-enabled UEs that are participating in ProSe Direct Discovery: a) Discoverer UE: The UE transmits a request containing certain information about what it is interested in discover. b) Discoveree UE: The UE that receives the request message may respond with some information related to the discoverer's request.

In an example, it is equivalent to "who is there/are you there". The discoverer UE sends information about other UEs that may like to receive responses from, e.g. the information may be about a ProSe application identity corresponding to a group and the members of the group may respond.

When using Model B discovery, the discoverer UE and discoveree UE may announce in the carrier frequency signaled by the serving PLMN. When inter-PLMN discovery transmission is supported, the carrier frequency may be operated by a PLMN other than the serving PLMN. The discoverer UE and discoveree UE may be allowed to monitor in the serving PLMN and Local PLMNs when authorized. In an example implementation, only restricted discovery type may support by Model B. In an example application, the public safety discovery may be considered restricted. The monitoring UE/discoverer UE may need to have authorization (such as through pre-provisioned parameters) to perform discovery of the appropriate service(s).

The public safety discovery is considered restricted and depending on Model A or Model B, it may use ProSe restricted code for Model A, it may use ProSe query code/ ProSe response code respectively for Model B.

These code parameters may be n bits, e.g. 64 bits, and may be part of ProSe Application Code. They may correspond to one or more restricted ProSe application user ID(s) (RPAUID). The ProSe application user ID may be allocated and bound to ProSe discovery UE ID (PDUID) by the ProSe application server.

Figure 6:
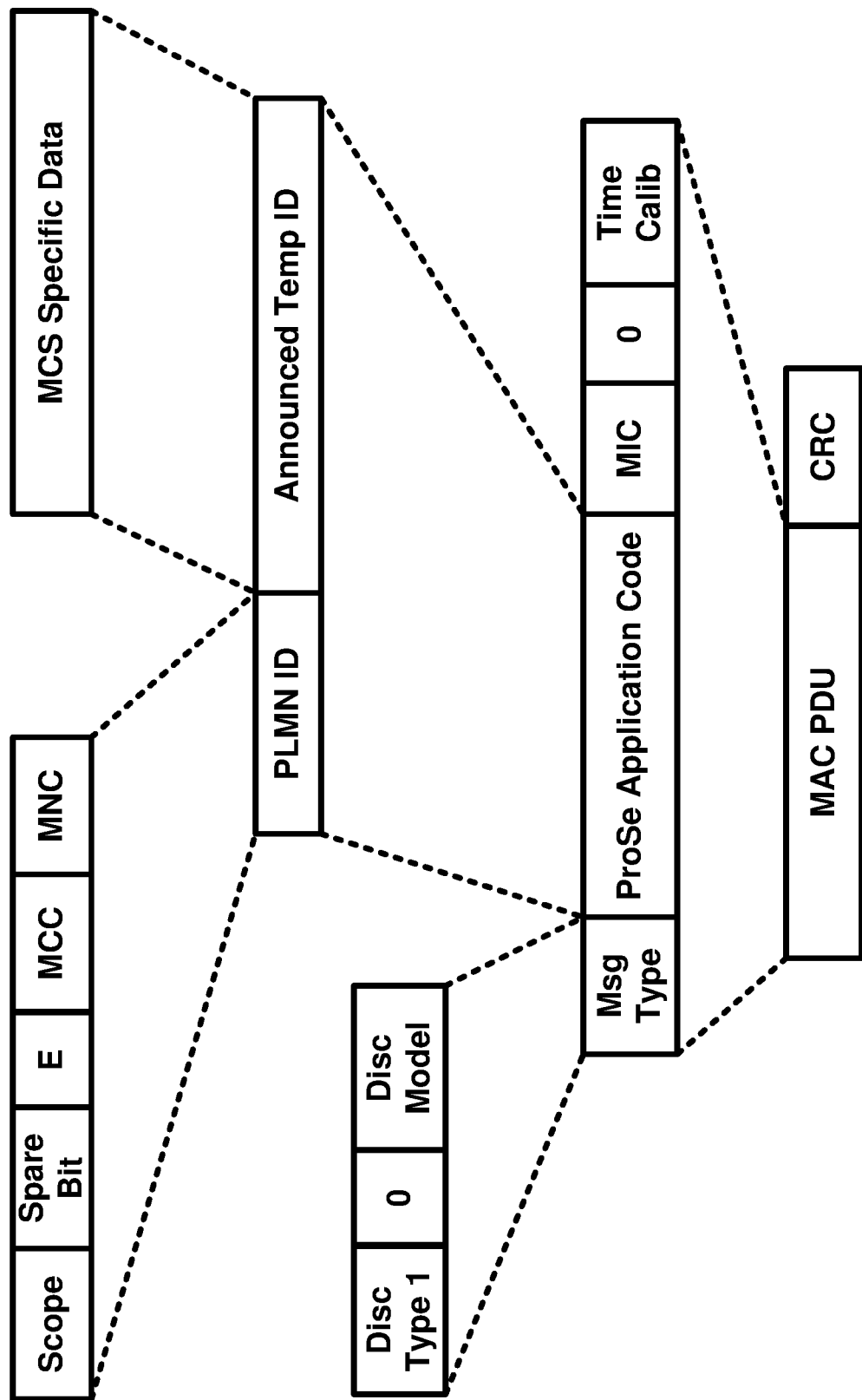

FIG. 6 is an example of a ProSe Discovery message which may be employed for discovery procedures in Model A and Model B. In Model A, the announcing MCS UE may use ProSe restricted code and if the application-controlled extension is used, it may use ProSe restricted code prefix and ProSe restricted code suffix(es) to announce its identity over the PC5 interface. The monitoring MCS UE may use discovery filter which may be provided by the HPLMN ProSe function comprising the ProSe restricted code (or ProSe restricted code prefix with ProSe Restricted Code suffix pool if restricted direct discovery with application-controlled extension was requested by the announcing MCS UE) to monitor the announcing MCS UE for a duration of time.

Model A may compromise a procedure for the announcing MCS UE and a procedure for the monitoring MCS UE. It may include a matching procedure for the case when the monitoring MCS UE receives ProSe restricted code over the air that matches the discovery filter provided by the HPLMN ProSe function to the monitoring MCS UE in the discovery response message, however the corresponding restricted ProSe application UE identity (RPAUID) does not have valid validity timer.

Figure 7:
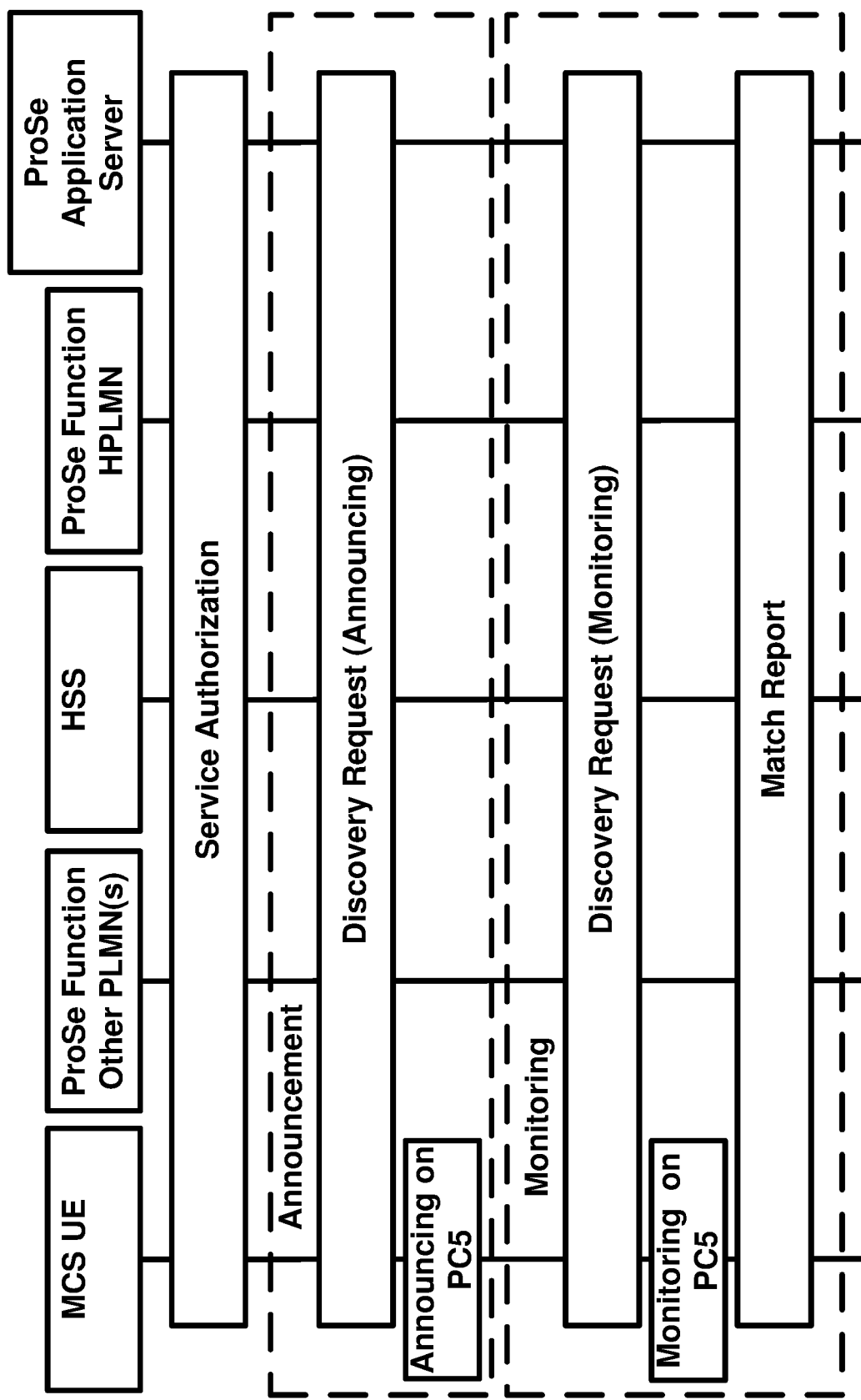
FIG. 7 is a flow diagram of an example procedure for Model A discovery as per an aspect of an embodiment.

FIG. 7 is a flow diagram of an example procedure for Model A discovery. This example procedure for the Model A discovery may include one or more of the following:

Authorization: The MCS UE may get authorized for restricted ProSe direct discovery. In an example, MCS may be public safety and the ProSe direct discovery may be restricted.

Announcement: The announcing MCS UE may request for discovery and may receive the ProSe restricted code (or ProSe restricted code prefix and ProSe restricted code suffix(es) to announce itself, if the application-controlled extension is used). The announcing MCS UE may announce the ProSe restricted code (or ProSe restricted code prefix and ProSe restricted code suffix(es) to announce itself, if the application-controlled extension is used).

Monitoring: The monitoring MCS UE may request for discovery and may receive the ProSe Filter comprising the ProSe Restricted Code (or ProSe Restricted Code Prefix and ProSe Restricted Code Suffix(es) to announce itself, if the application-controlled extension is used). The monitoring MCS UE may monitor for the ProSe restricted code (or ProSe restricted code prefix and ProSe restricted code suffix(es) to announce itself, if the application-controlled extension is used).

Match-Reporting: The monitoring UE may match-report if having monitored ProSe restricted code (or ProSe restricted code prefix and ProSe restricted code suffix(es) to announce itself, if the application-controlled extension is used) with corresponding PRAUID with no valid validity timer.

Figure 8:
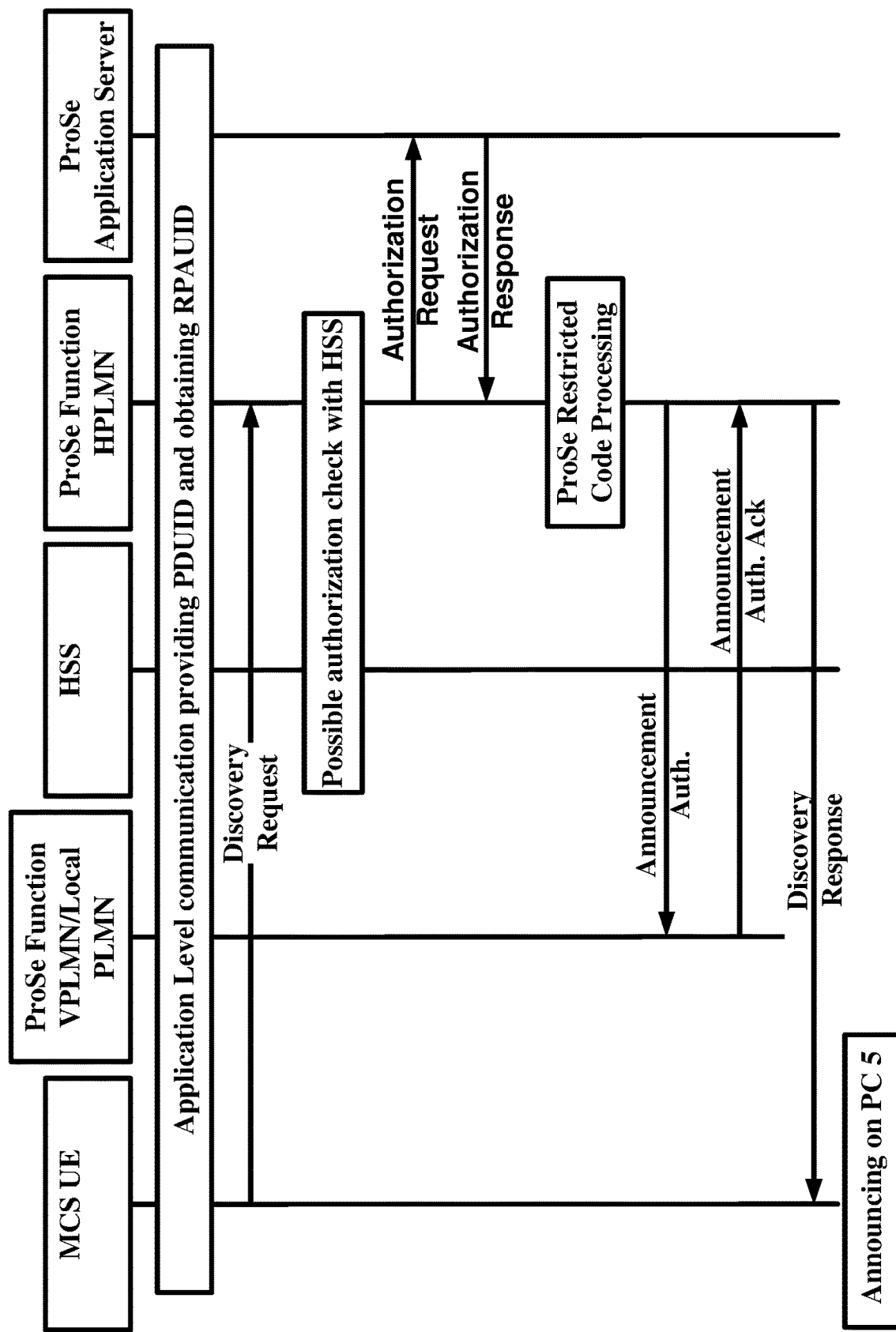
FIG. 8 is a flow diagram showing an example procedures for the announcing MCS UE as per an aspect of an embodiment.
Figure 9:
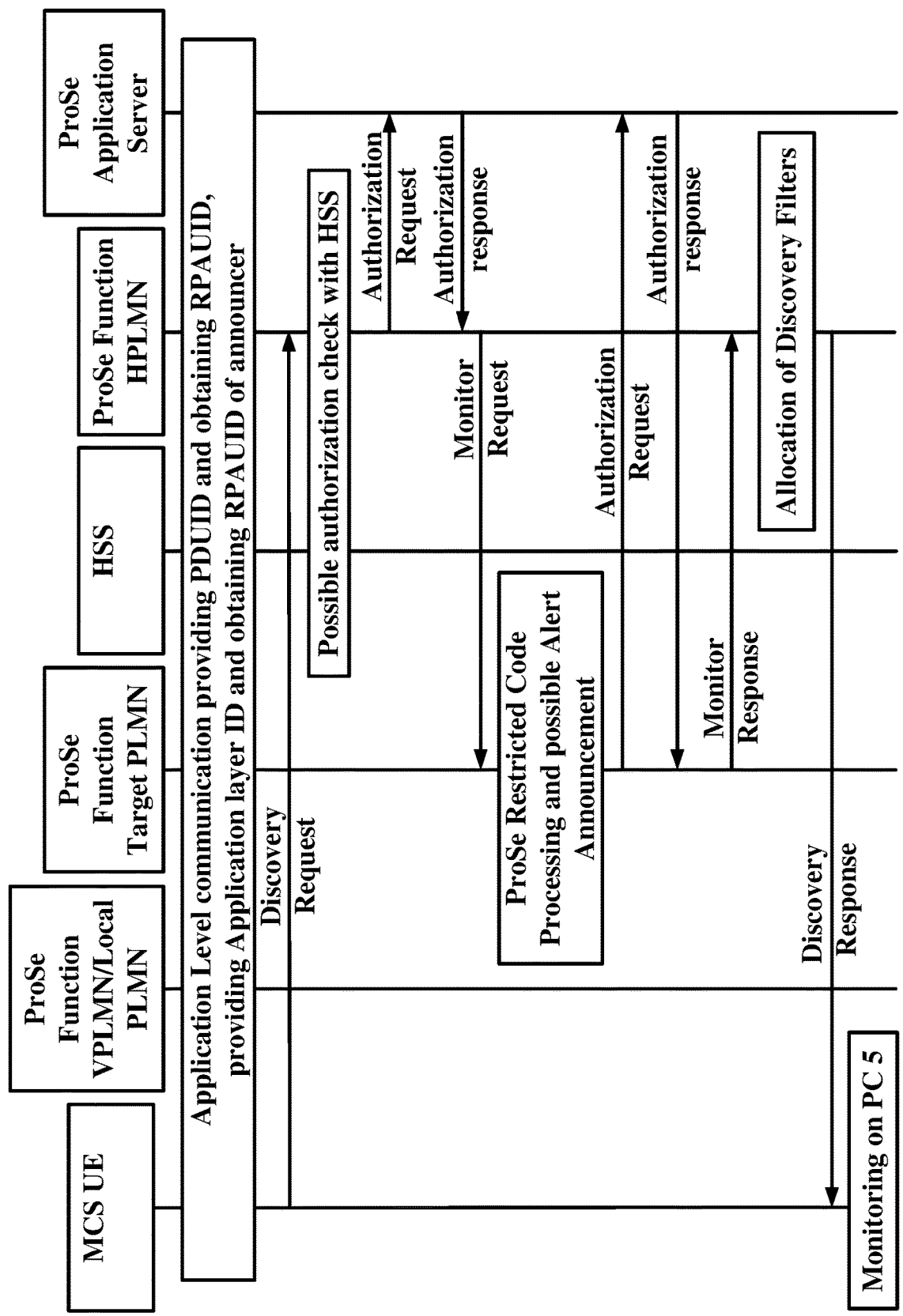
FIG. 9 is a flow diagram showing an example procedures for the monitoring MCS UE as per an aspect of an embodiment.
Figure 10:
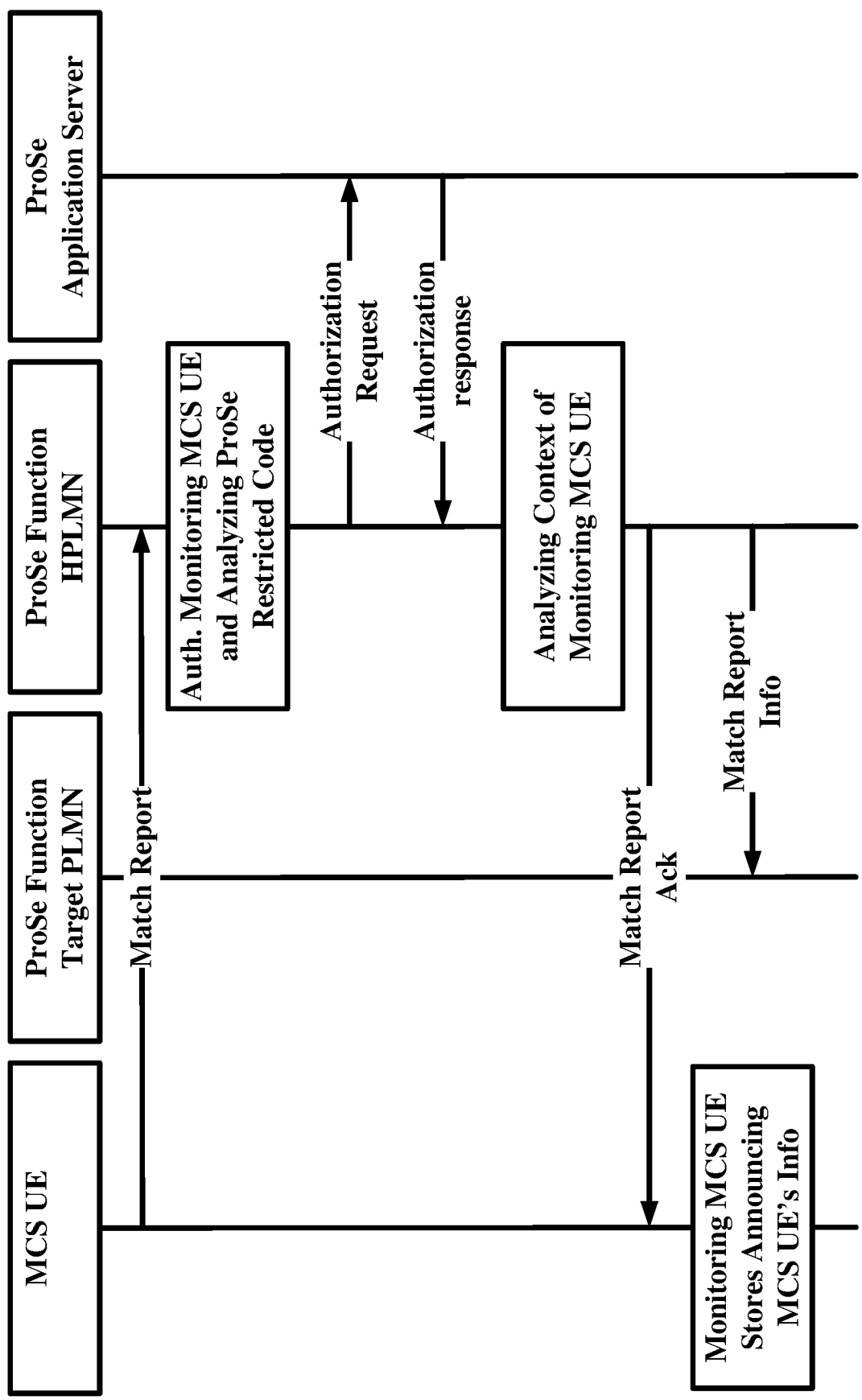
FIG. 10 is a flow diagram showing an example match reporting procedure as per an aspect of an embodiment.

The announcing, monitoring, and match-reporting procedures are explained below. FIG. 8, FIG. 9, and FIG. 10.

FIG. 8 is a flow diagram showing an example procedures for the announcing MCS UE. An example procedure for the announcing MCS UE is as follows:

The application client in the MCS UE may retrieve the ProSe discovery UE identity (PDUID) and may provide it to the ProSe application server. The ProSe application server may allocate a restricted ProSe application UE identity (RPAUID) for that PDUID, may store the binding between the PDUID and the RPAUID and may return the RPAUID to the application client in the MCS UE. MCS UE may use RPAUID instead of PDUID since MCS is a public safety feature.

MCS UE may construct a discovery request message containing RPAUID, UE identity set to international mobile subscriber identity (IMSI), command=announce, discovery type set to restricted discovery, application ID set to unique identifier of the MCS application ID, discovery entry ID indicating if this is a new request, optional requested discovery timer set to validity timer associated with the expected ProSe restricted code from the HPLMN ProSe Function (if it is set to zero, the MCS UE is requesting to remove the discovery entity ID and release the associated resources), (if application-controlled extension is used) application level container containing the request and the relevant information, announcing type such as "on demand" for the indicated application, and the PLMN ID of the carrier frequency in announcing PLMN ID if the serving PLMN signaled carrier frequency is not operated by HPLMN or VPLMN and if inter-PLMN ProSe discovery transmission is supported. MCS UE may send the discovery request message to HPLMN ProSe function.

HPLMN ProSe function may check for authorization for the MCS application. If there is not any associated MCS UE context, the HPLMN ProSe function may check with HSS and if needed may create a new context for the MCS UE that contains the subscription parameters for this MCS UE. HSS may provide MSISDN of the MCS UE and PLMN ID of where the MCS UE is registered.

The HPLMN ProSe function may send an authorization request containing RPAUID and request type set to "restricted discovery/announce" towards the ProSe application server. The authorization request may contain allowed number of suffixes if restricted Direct Discovery with application-controlled extension is used. The request type is set to "restricted discovery with application-controlled extension/announce".

The ProSe application server may answer by an authorization response containing PDUID(s) corresponding the RPAUID stored in the ProSe application server and response type set to "restricted discover/announce ack". The authorization respond may include ProSe restricted code suffix pool with allocated suffixes by the ProSe Application if restricted direct discovery with application-controlled extension is used. The response type is set to "restricted discovery with application-controlled extension/announce ack".

HPLMN ProSe function may assign a ProSe restricted code corresponding to the RPAUID in the discovery request and an associated validity timer which identifies the duration of validity of the ProSe restricted code. MCS UE may use this ProSe restricted code within this validity duration if PLMN is not changed. If restricted direct discovery with application-controlled is used, then HPLMN ProSe functions may assign ProSe restricted code prefix instead of ProSe restricted code. If discovery request message indicates "on demand" announcing and the "on demand" announcing is authorized and enabled based on application ID and operator's policy, the HPLMN ProSe function may store RPAUID, PreSe restricted code (or ProSe restricted code prefix) with the associated validity timer, and enabled indicator in the user context. "On demand" announcing is only activated based on an ongoing monitoring request, otherwise, the following steps are not executed.

If the Discovery request is authorized, HPLMN ProSe Function may construct announce authorization message containing RPAUID, MCS application ID, ProSe restricted code (or ProSe restricted code prefix with ProSe restricted code suffix pool if restricted direct discovery with application-controlled extension is used) set to assigned code for this request, UE ID set to IMSI or mobile station identifier number (MSISDN), discovery entry ID, and validity timer. The HPLMN ProSe function may update the existing announcing MCS UE's discovery entry with the new ProSe restricted code (or the ProSe restricted code prefix with ProSe restricted code suffix pool if restricted direct discovery with application-controlled extension is used) and the new validity timer by using the MCS UE's corresponding discovery entry ID included in the discovery request message. If discovery request message included discovery timer set to zero for a discovery entity ID, then the HPLMN ProSe function may inform the VPLMN ProSe function to remove resources for that discovery entry ID by setting the timer to zero. The HPLMN ProSe function may send the announce authorization message towards the VPLMN ProSe Function.

The VPLMN ProSe function may acknowledge the HPLMN ProSe function that it authorizes the MCS UE to perform restricted discovery announcing if the announce authorization message contain a new discovery entry ID. If the discovery entry ID already exists, the VPLMN ProSe function may acknowledge the update as requested.

If the announcing is not "on-demand", the HPLMN ProSe function may construct a discovery respond message with ProSe restricted code (or ProSe restricted code prefix with ProSe restricted code suffix pool if restricted direct discovery with application-controlled extension is used), validity timer, and discovery entity ID. If the announcing is "on-demand" and is authorized and enabled, the HPLMN ProSe function may construct the discovery respond message with validity timer, announcing enabled indicator, and discovery entity ID. The validity timer is set to zero if it is zero in discovery request message originated by the MCS UE. The HPLMN ProSe function may send the discovery respond message towards the MCS UE.

MCS UE may start announcing the provided ProSe restricted code. if restricted direct discovery with application-controlled extension is used, the MCS UE may append a ProSe restricted code suffix from the received ProSe restricted code suffix pool to the ProSe Restricted Code Prefix to form a ProSe Restricted Code. The MCS UE may use different suffixes from the provided ProSe restricted code suffix pool to form and announce different ProSe restricted codes without having to contact the HPLMN ProSe function as long as the validity timer permits. If "on-demand" announcing is used and the HPLMN ProSe function has not provided ProSe restricted code (or ProSe restricted code prefix with ProSe restricted code suffix pool if restricted direct discovery with application-controlled extension is used), the MCS UE may need to wait for an announcing alert request message from the HPLMN ProSe function before announcing on PC5 interface.

FIG. 9 is a flow diagram showing an example procedures for the monitoring MCS UE. The example procedure for monitoring MCS UE is as follows:

The application client in the MCS UE may retrieve the ProSe discovery UE identity (PDUID) and may provide it to the ProSe application server. The ProSe application server may allocate a restricted ProSe application UE identity (RPAUID) for that PDUID, may store the binding between the PDUID and the RPAUID and may return the RPAUID to the application client in the MCS UE. The MCS UE may obtain RPAUIDs of those MCS target users from the ProSe Application Server passed in an application level container. RPAUID instead of PDUID is used since MCS is a public safety feature.

In order to get the discovery filter, the monitoring MCS UE may construct a discovery request message comprising RPAUID set to the monitoring MCS UE identity, UE identity set to IMSI, command=monitor, discovery type, application ID set to unique identifier for the application that triggered discovery procedure, application level container compromising the Target RPAUIDs that the MCS UE is to monitor, discovery entry ID showing the discovery identity that it is a new discovery or an existing one, and the optional requested discovery timer. The requested discovery timer may be set to zero to indicate HPLMN to delete the discovery filter(s) for that discovery entry ID. The application level container may include some information about ProSe restricted code suffix such as group or user specific information if direct discovery with application-controlled extension is used. The MCS UE may send the discovery request message towards HPLMN ProSe function.

HPLMN ProSe function may check for authorization for the MCS application. If there is not any associated MCS UE context, the HPLMN ProSe function may check with HSS and if needed may create a new context for the MCS UE that contains the subscription parameters for this MCS UE. HSS provides also MSISDN of the MCS UE and PLMN ID of where the MCS UE is registered.

The HPLMN ProSe function may send an authorization request containing RPAUID and request type set to "restricted discovery/monitor" towards the ProSe application server. If restricted direct discovery with application-controlled extension is used, the request type is then set to "restricted discovery with application-controlled extension/monitor".

The ProSe application server constructs an authorization response comprising target PDUIDs and corresponding Target RPAUID that the RPAUID in the authorization request may monitor, PDUID of the requesting MCS UE, and response type set to "restricted discovery/monitor ack" (or to "restricted discovery with application-controlled extension/monitor ack" if restricted direct discovery with application-controlled extension is used). The ProSe application server may send the authorization response towards the HPLMN ProSe function.

The HPLMN ProSe function may construct a monitor request message comprising RPAUID of monitoring MCS UE, UE identity set to IMSI or MSISDN, Target PDUID and corresponding target RPAUID, application ID set to unique identifier for application that triggered the discovery procedure, and discovery entry ID to identify the discovery entry being new or an existing one. The HPLMN ProSe function may send the monitor request towards the target PLMN ProSe function which belongs to the monitoring MCS UE. If the discovery entry ID is an existing one, the target PLMN ProSe function may modify the existing discovery procedure with the parameters included in the monitor request message.

The target PLMN ProSe function may retrieve the ProSe restricted code (or the ProSe restricted code prefix if the restricted direct discovery with application-controlled extension is used) corresponding to the targeted PDUID, targeted RPAUID, and application ID. If in the context of the announcing MCS UE, the announcing enabled indicator is stored, the target PLMN ProSe function may construct an announcing alert request message comprising RPAUID indicating which monitoring MCS UE is interested in the targeted MCS UE announcement, application ID set to unique identifier for the application that triggered discovery procedure, ProSe restricted code which was retrieved from the context of the targeted announcing MCS UE (or ProSe restricted code prefix with ProSe restricted code suffix pool if restricted direct discovery with application-controlled extension was requested by the announcing MCS UE), and discovery entry ID to indicate it is a new discovery entity or an existing one. The target PLMN PRoSe function may send the message towards the targeted MCS UE and upon receipt of the announce alert response message from that MCS announcing UE, the ProSe function removes the announcing enabled indication associated to the ProSe restricted code (or ProSe restricted code prefix with ProSe restricted code suffix pool if restricted direct discovery with application-controlled extension was requested by the announcing MCS UE) from the Announcing MCS UE context. The MCS UE may now start announcing the ProSe restricted code (or ProSe restricted code prefix with ProSe restricted code suffix pool if restricted direct discovery with application-controlled extension was requested by the announcing MCS UE).

The target ProSe function may construct an authorization request message comprising RPAUID set to that of the monitoring MCS UE, Request Type set to "restricted discovery/permission", and target RPAUID set to that of the announcing MCS UE. The target ProSe function may send the authorization request message towards the ProSe application server.

The ProSe application server may acknowledge the target ProSe function by constructing an authorization response message comprising PDUID of the announcing MCS UE which is to be monitored and response type set to "restricted discovery/permission ack" and by sending it towards the target PLMN ProSe function.

The target ProSe function constructs a monitor response message compromising ProSe restricted code (or ProSe restricted code prefix with ProSe restricted code suffix pool if restricted direct discovery with application-controlled extension was requested by the announcing MCS UE) and the corresponding validity timer. The target ProSe function may send the monitor response message towards the HPLMN ProSe function.

From the ProSe application server, the HPLMN ProSe function has now retrieved the ProSe restricted code (or ProSe restricted code prefix with ProSe restricted code suffix pool if restricted direct discovery with application-controlled extension was requested by the announcing MCS UE) and the corresponding validity timer for each pair of target PDUID-target RPAUID bound with application ID and stored as the user content of the monitoring MCS UE. The HPLMN ProSe function based on the ProSe restricted code (or ProSe restricted code prefix with ProSe restricted code suffix pool if restricted direct discovery with application-controlled extension was requested by the announcing MCS UE) and the corresponding validity timer, allocates a discovery filter with corresponding time-to-live (TTL).

The HPLMN ProSe function may construct a discovery response message comprising target RPAUID(s) and the corresponding discovery filter(s) that comprises ProSe restricted code (or ProSe restricted code prefix with ProSe restricted code suffix pool if restricted direct discovery with application-controlled extension was requested by the announcing MCS UE) to be monitored and the corresponding TTL showing how long the filter is valid. If the requested discovery timer in discovery request message sent by MCS monitoring UE was set to zero, the TTL in the discovery response message is set to zero. The discovery response message also comprises discovery entry ID to identify the discovery entity. The HPLMN ProSe function may send the discovery response message towards the monitoring MCS UE.

The MCS UE uses the discovery filter to monitor the announcing MCS UE.

FIG. 10 is a flow diagram showing an example match reporting procedure. The example procedure for match reporting for announcing/monitoring is as follows:

If the monitoring MCS UE has over the air received a ProSe restricted code (or the ProSe restricted code prefix and the ProSe restricted code suffix if the restricted direct discovery with application-controlled extension is used) is matching the discovery filter obtained in the discovery response message from the HPLMN ProSe function but the announcing MCS UE does not have an RPAUID with a valid TTL, the monitoring MCS UE may construct a match report message comprising its own RPAUID, its IMSI or MSISDN as UE identity, discovery type set to "restricted discovery", application ID set to unique identifier for the application that triggered the monitoring request, the over the air received ProSe restricted code, optional metadata requested, and announcing PLMN ID of the PLMN where the announcing MCS UE was monitored. The monitoring MCS UE transmits the match report message towards the HPLMN ProSe function.

The HPLMN ProSe function may verify if the monitoring MCS UE may perform restricted discovery and may analyze ProSe restricted code (or the ProSe restricted code prefix and the ProSe restricted code suffix if the restricted direct discovery with application-controlled extension is used). The HPLMN ProSe function may identify the announcing MCS UE's RPAUID in the context of the monitoring MCS UE.

If metadata requested was included to the originated match report message by the monitoring MCS UE, the HPLMN ProSe function may locate the ProSe application server from the application ID and may construct an authorization request message comprising monitoring MCS UE's RPAUID, announcing MCS UE's RPAUID, and request type set to "restricted discovery/match". The HPLMN ProSe function may send the authorization request message towards the ProSe application server. This step is optional if metadata requested was not included into the original match report message.

The ProSe application server may construct an authorization response comprising monitoring MCS UE's PDUID, announcing MCS UE's PDUID, response type set to "restricted discovery/match ack", and metadata corresponding to the Announcing MCS UE.

The HPLMN ProSe function may verify that the PDUID belongs to the monitoring MCS UE and the announcing MCS UE's PDUID are the same as the announcing MCS UE's PDUID that is stored in the context of the Monitoring MCS UE.

The HPLMN ProSe function may construct a match report ack comprising application ID set to unique identifier for the application that triggered the monitoring request, announcing MCS UE's RPAUID, validity timer, and optionally meta data.

The monitoring MCS UE may store the mapping between the ProSe restricted code (or the ProSe restricted code prefix and the ProSe restricted code suffix if the restricted direct discovery with application-controlled extension is used), announcing MCS UE's PRAUID, the application ID unique identifier of the application that triggered the monitoring procedure, and the related validity timer.

The HPLMN ProSe function may construct a Mach Report Info message comprising Monitoring MCS UE's RPAUID, announcing MCS UE's RPAUID, announcing MCS UE's identity set to IMSI or MSISDN for charging purposes, ProSe restricted code (or the ProSe restricted code prefix and the ProSe restricted code suffix if the restricted direct discovery with application-controlled extension is used), and discovery type set to "restricted discovery". The HPLMN ProSe function may send the match report info message towards the announcing MCS UE's PLMN ProSe function and the ProSe function of the PLMN where the announcing MCS UE may be roaming in.

In Model B, the discoverer MCS UE may use ProSe query code to find the discoveree MCS UE. The discoveree MCS UE may use ProSe response code to identify itself. The ProSe response code is sent by the discoveree MCS UE over the air upon receiving a ProSe query code matching any discovery query filter(s). The discoverer MCS UE discovers then the discoveree MCS UE by matching the ProSe response code to any discovery response filter(s). The ProSe query code, and the discovery response filter(s) are allocated by HPLMN ProSe function to the discoverer MCS UE. The ProSe response code and discovery query filter(s) are allocated by the HPLMN ProSe function to the discoveree MCS UE.

Model B compromises procedure for the discoveree MCS UE and procedure for the discoverer MCS UE procedure. It may include matching procedure for the case when the discoverer MCS UE receives ProSe response code over the air that matches the discovery filter provided by the HPLMN ProSe function to the discoveree MCS UE in the discovery response message, however the corresponding RPAUID does not have valid validity timer. Model B is always for restricted discovery.

Figure 11:
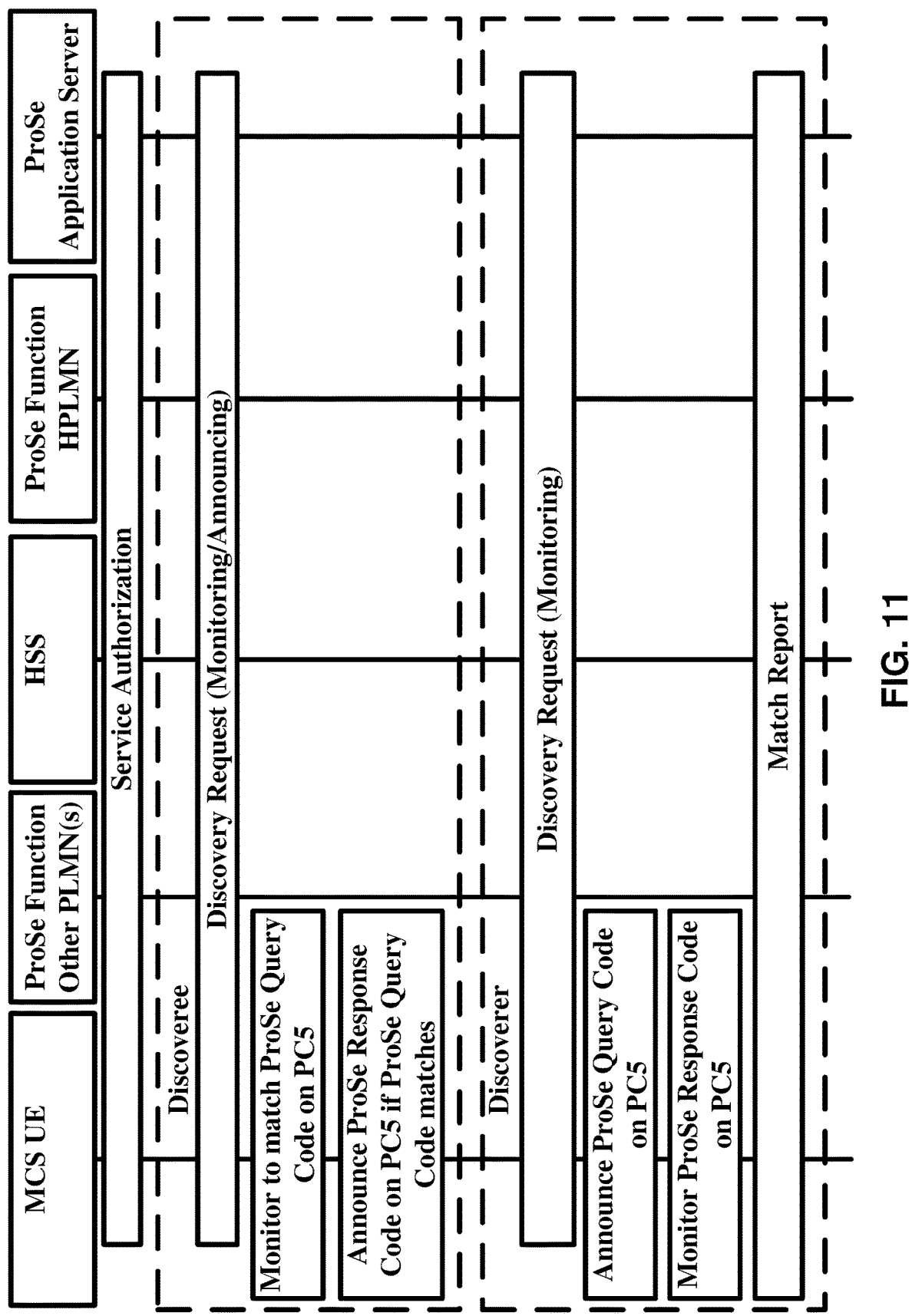
FIG. 11 is a flow diagram showing an example procedures for Model B discovery as per an aspect of an embodiment.

FIG. 11 is a flow diagram showing an example procedures for Model B discovery. The example procedure for the Model B discovery is as follows:

Authorization: The MCS UE may get authorized for restricted ProSe direct discovery. In an example, MCS may be public safety and the ProSe direct discovery may be restricted.

Discoveree procedure: The discoveree MCS UE may request for discovery and may receive the ProSe response code and associated discovery query filter(s). The discoveree MCS UE may employ the discovery filter(s) to monitor ProSe query code on PC5. The discoveree MCS UE may announce the ProSe response code if receiving a ProSe query code over the air which matches any of discovery filter(s).

Discoverer procedure: The discoverer MCS UE may request for discovery and may receive the ProSe query code and associated discovery response filter(s). The discoverer MCS UE may announce the ProSe query code on PC5 interface. The discoverer MCS UE may monitor ProSe response code on PC5 interface that may match any of the discovery response filter(s). The discoverer UE may match-report if having discovered ProSe response code with corresponding PRAUID with no valid validity timer.

Figure 12:
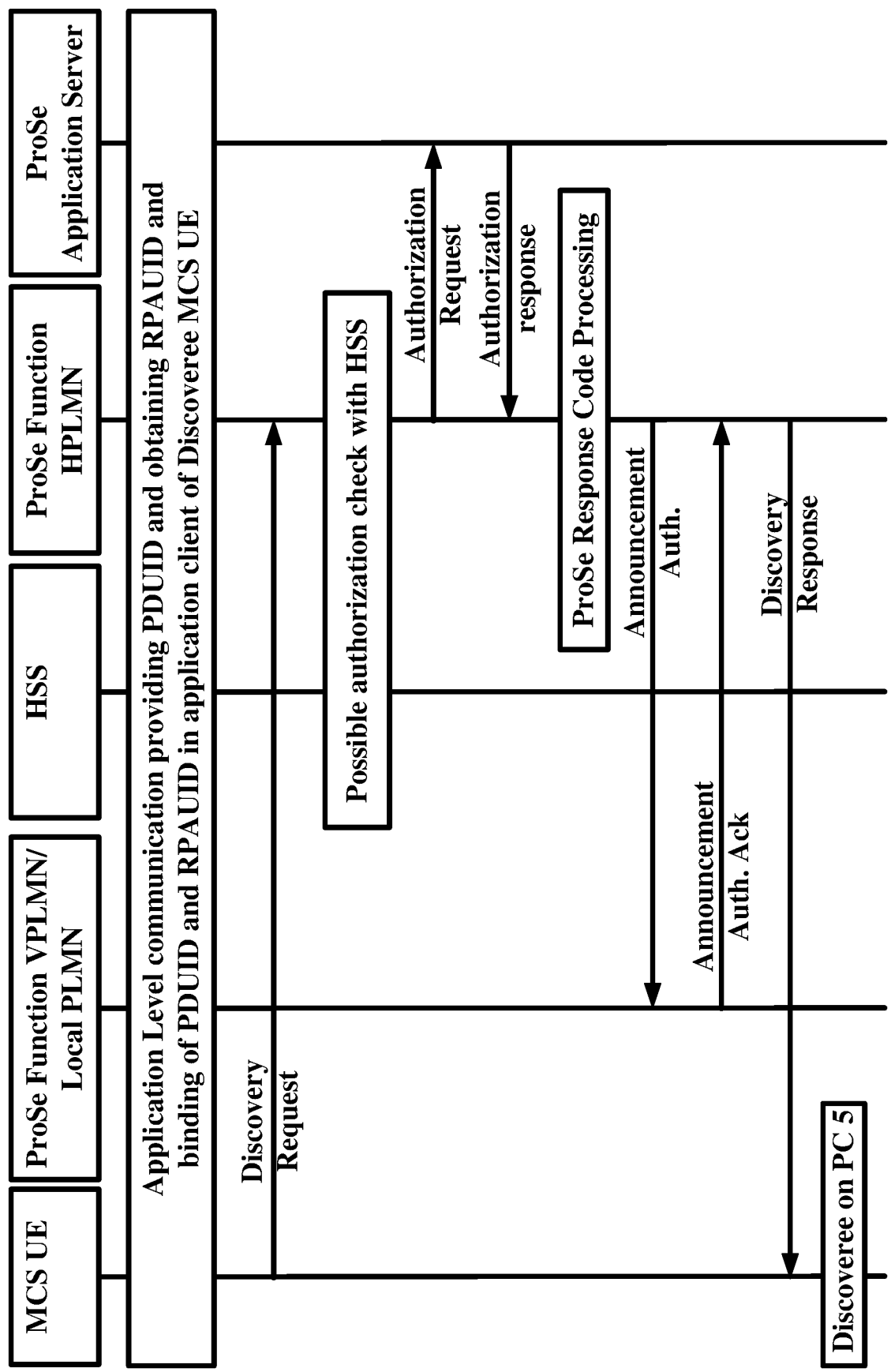
FIG. 12 is a flow diagram showing an example procedure for the discoveree MCS UE as per an aspect of an embodiment.

Example discoveree, discoverer, and match-reporting procedures are explained below with respect to FIG. 12, FIG. 13, and FIG. 14. FIG. 12 is a flow diagram showing an example procedure for the discoveree MCS UE. The example procedure for discoveree MCS UE is as follows:

The application client in the MCS UE may retrieve the ProSe discovery UE identity (PDUID) and may provide it to the ProSe application server. The ProSe application server may allocate a restricted ProSe application UE identity (RPAUID) for that PDUID, may store the binding between the PDUID and the RPAUID and may return the RPAUID to the application client in the MCS UE. The application client in the MCS UE may store the binding between the RPAUID and its own PDUID and may use those RPAUID to perform discoveree request procedure.

The discoveree MCS UE may establish connection to HPLMN ProSe function and may construct a discovery request message comprising RPAUID set to what the MCS UE will announce, UE identity set to IMSI, command indicating this is for discoveree UE, discovery type set to "restricted discovery", discovery model indicating Model B, application ID set to unique identifier for the application that triggered discovery procedure, discovery entry ID showing the discovery identity that it is a new discovery or an existing one, and PLMN ID of the carrier frequency in announcing PLMN ID if the serving PLMN signaled carrier frequency is not operated by HPLMN or VPLMN and if inter-PLMN ProSe discovery transmission is supported. MCS UE may send the discovery request message to HPLMN ProSe function.

HPLMN ProSe function may check for authorization for the MCS application. If there is not any associated MCS UE context, the HPLMN ProSe function may check with HSS and if needed may create a new context for the MCS UE that contains the subscription parameters for this MCS UE. HSS may provide MSISDN of the MCS UE and PLMN ID of where the MCS UE is registered.

The HPLMN ProSe function may locate the ProSe application server based on the application ID in the discovery request message and may send an authorization request containing RPAUID and request type set to "restricted discovery/response" towards the ProSe application server.

The ProSe application server may answer by an authorization response containing PDUID(s) corresponding the RPAUID stored in the ProSe application server and response type set to "restricted discover/response ack".

The HPLMN ProSe function may verify that at least of one of the PDUID(s) may belong to the discoveree MCS UE. The HPLMN ProSe function may assign a ProSe response code and ProSe query code with the associated discovery query filter(s). The ProSe response code corresponds to the RPAUID in the discovery request and the HPLMN ProSe function may assign an associated validity timer for the ProSe response code and ProSe query code with the associated discovery query filter(s). The validity timer identifies the duration of validity of the ProSe response code and ProSe query code with the associated discovery query filter(s). The discoveree MCS UE may use this ProSe response code within this validity duration if PLMN is not changed. The HPLMN ProSe function may store ProSe response code with its associated validity timer and ProSe query code with associated discovery query filter(s) in the context of the MCS user.

If the discovery request is authorized, HPLMN ProSe function may construct announce authorization message containing RPAUID, MCS application ID, ProSe response set to assigned code for this request, UE ID set to IMSI or MSISDN, discovery entry ID to identify the discovery entry, and validity timer indicating how long the ProSe response code will be valid. The HPLMN ProSe function may send the announce authorization message towards the VPLMN ProSe function.

The VPLMN ProSe function may acknowledge the HPLMN ProSe function that it authorizes the MCS UE to perform restricted discovery announcing if the announce authorization message contain a new discovery entry ID. If the discovery entry ID already exists, the VPLMN ProSe function may acknowledge the update as requested i.e. updating the discoveree MCS UE's discovery entry by the new ProSe response code and its associated validity timer.

The HPLMN ProSe function may construct a discovery response message with discovery type set to Model B, ProSe response code, discovery query filter(s) suited for certain ProSe Query code, validity timer associated to ProSe response code and the discovery query filter(s), and discovery entity ID to identify the discovery identity. The MCS discoveree UE may use the discovery query filter(s) (which may be multiple) to determine which ProSe query code triggers that the MCS discoveree UE announces the assigned ProSe response code. The HPLMN ProSe function may send the discovery response message towards MCS discoveree UE.

The MCS discoveree UE may use the discovery query filter(s) which many be multiple to determine which ProSe query code triggers that the MCS discoveree UE announces the assigned ProSe response code. If the validity timer expires, the MCS discoveree ue may send a new discovery request message towards the HPLMN ProSe function.

Figure 13:
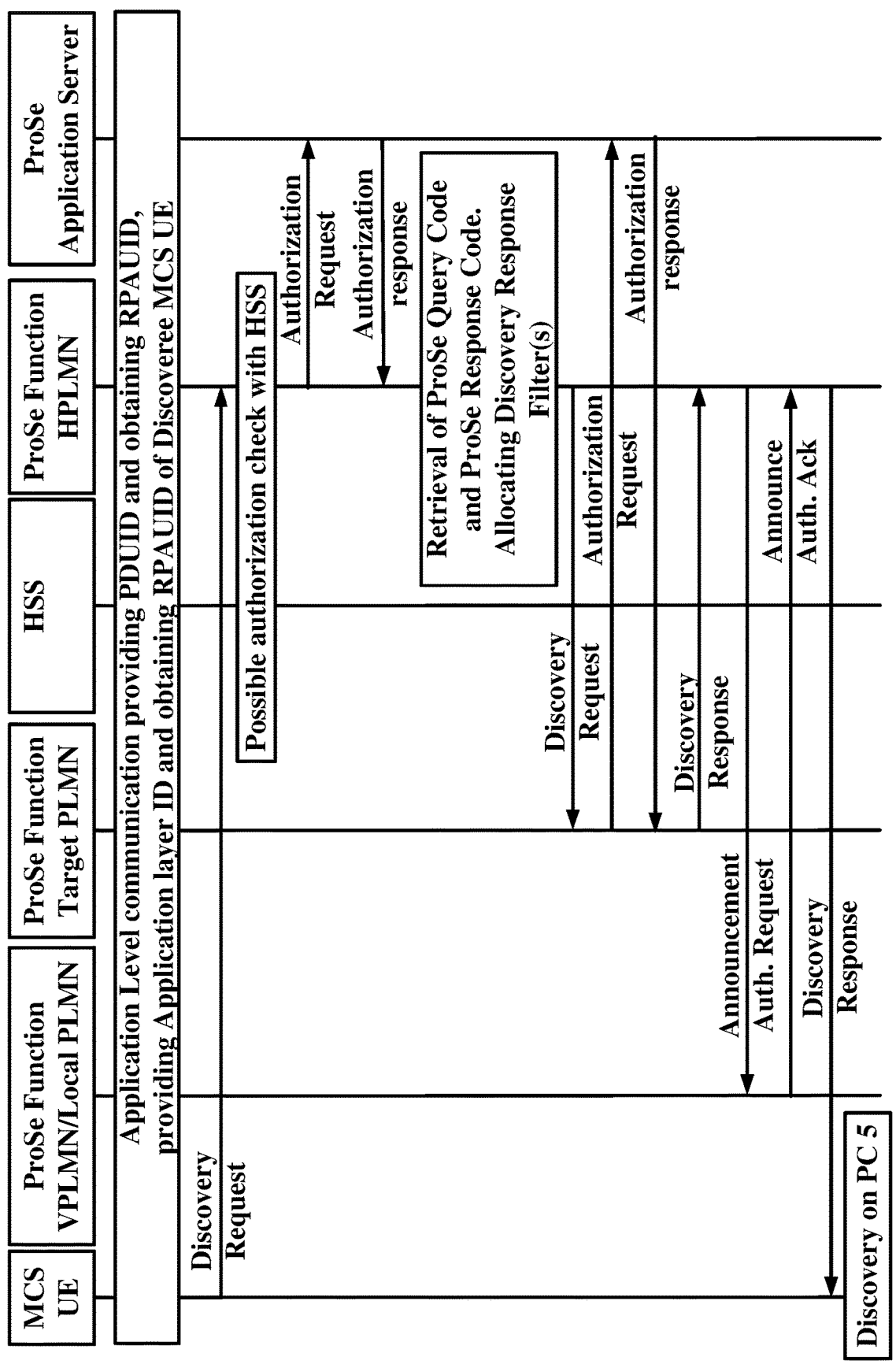
FIG. 13 is a flow diagram of an example procedure for discoverer MCS UE as per an aspect of an embodiment.

FIG. 13 is a flow diagram of an example procedure. The procedure for discoverer MCS UE is as follows:

The application client in the MCS UE may retrieve the ProSe discovery UE identity (PDUID) and may provide it to the ProSe application server. The ProSe application server allocates a restricted ProSe application UE identity (RPAUID) for that PDUID, may store the binding between the PDUID and the RPAUID and may return the RPAUID to the application client in the MCS UE. The MCS UE may obtain RPAUIDs of those MCS target users from the ProSe application server passed in an application level container. RPAUID instead of PDUID may be used for public safety feature MCS.

The discoverer MCS UE may establish connection to the MPLMN ProSe function and may construct a discovery request message comprising RPAUID set to what the discoverer MCS UE wants to announce, UE identity set to IMSI, command showing this is for ProSe query procedure, discovery type set to "restricted discover", discovery model set to Model B, application ID set to unique identifier for the application that triggered discovery procedure, application level container comprompising the target RPAUIDs that the MCS UE is to discover, discovery entry ID showing the discovery identity that it is a new discovery or an existing one, and the optional requested discovery timer. The requested discovery timer is set to zero to indicate HPLMN to delete the discovery filter(s) for that discovery entry ID. The MCS UE may send the discovery request message towards HPLMN ProSe Function.

HPLMN ProSe function may check for authorization for the MCS application. If there is not any associated MCS UE context, the HPLMN ProSe function may check with HSS and if needed may create a new context for the MCS UE that contains the subscription parameters for this MCS UE. HSS may provide MSISDN of the MCS UE and PLMN ID of where the MCS UE is registered.

The HPLMN ProSe function may locate the ProSe application server based on the application ID in the discovery request message and may send an authorization request containing RPAUID, request type set to "restricted discovery/query", and application level container towards the ProSe application server.

The ProSe application server may construct an authorization response comprising target PDUIDs and corresponding target RPAUID that the RPAUID in the authorization request may discover, PDUID of the requesting MCS UE, and response type set to "restricted discovery/query ack". The ProSe application server may send the authorization response towards the HPLMN ProSe function.

The HPLMN ProSe function may allocate the context for the discoveree UE(s) if the PLMN ID in the target PDUID-target RPAUID corresponds to a valid ProSe response code. The HPLMN ProSe function may allocate the discovery response filter(s) which trigger the MCS discoveree UE to transmit the ProSe response code. This procedure has expiration time which is specified by validity timer.

The HPLMN ProSe function may construct a discovery request message comprising RPAUID of discoveree MCS UE, UE identity set to IMSI or MSISDN, target PDUID and corresponding target RPAUID, application ID set to unique identifier for application that triggered the discovery procedure, and discovery entry ID to identify the discovery entry being new or an existing one. The HPLMN ProSe function may send the discovery request towards the target PLMN ProSe Function which belongs to the discoveree MCS UE. If the discovery entry ID is an existing one, the Target PLMN ProSe function may modify the existing discovery procedure with the parameters included in the discovery request message.

The target ProSe Function has an option to construct an authorization request message comprising RPAUID set to that of the discoverer MCS UE, Request Type set to "restricted discovery/query", and target RPAUID set to that of the discoveree MCS UE. The target ProSe function may send the authorization request message towards the ProSe application server.

The ProSe application server may acknowledge the target ProSe function by constructing an authorization response message comprising PDUID of the discovery MCS UE, response type set to "restricted discovery/query ack", and target PDUID of the discoveree MCS UE. The ProSe application server may send the authorization response message towards the target PLMN ProSe function.

The target PLMN ProSe function may allocate the context of the discoveree MCS UE based on target PDUEID-target RPAUID and the application ID. The target PLMN ProSe function may respond with a discovery response comprising ProSe query code which will be used by HPLMN ProSe function to build the discovery query filter so that it triggers the discoveree UE to send ProSe Response code, the actual ProSe response code, and validity timer to indicate for how long the ProSe Query code and ProSe response code are valid.

The HPLMN ProSe function may construct an announce authorization message comprising RPAUID of the discovery MCS UE, application ID, ProSe query code and its associated validity timer, UE identity set to IMSI or MSISDN of discovery MCS UE for charging purposes in the visiting domain, and discovery entry ID to identify the discovery entry. The HPLMN ProSe function may send the announce authorization message towards the VPLMN ProSe function.

The VPLMN may acknowledge that it authorizes the discovery MCS UE to perform ProSe direct discovery procedure. If the discovery entry ID in the announce authorization message corresponded an already discovery entry, the VPLMN ProSe function may acknowledge the replacement of the existing ProSe query code and its associated validity timer.

The HPLMN ProSe function may construct the discovery response message comprising discovery model set to Model B, ProSe query code, one or multiple discovery response filters which are generated by the HPLMN ProSe function based on ProSe response code, and validity timer for how long the ProSe query code and discovery response filter(s) are valid. The HPLMN ProSe Function may transmit the Discovery Response message to the Discoverer MCS UE.

The discoverer MCS UE may obtain the information from the discovery response message to discover discoveree MCS UE. If the validity timer is expired, the discoverer MCS UE may send a new discovery request message towards the HPLMN ProSe function.

Figure 14:
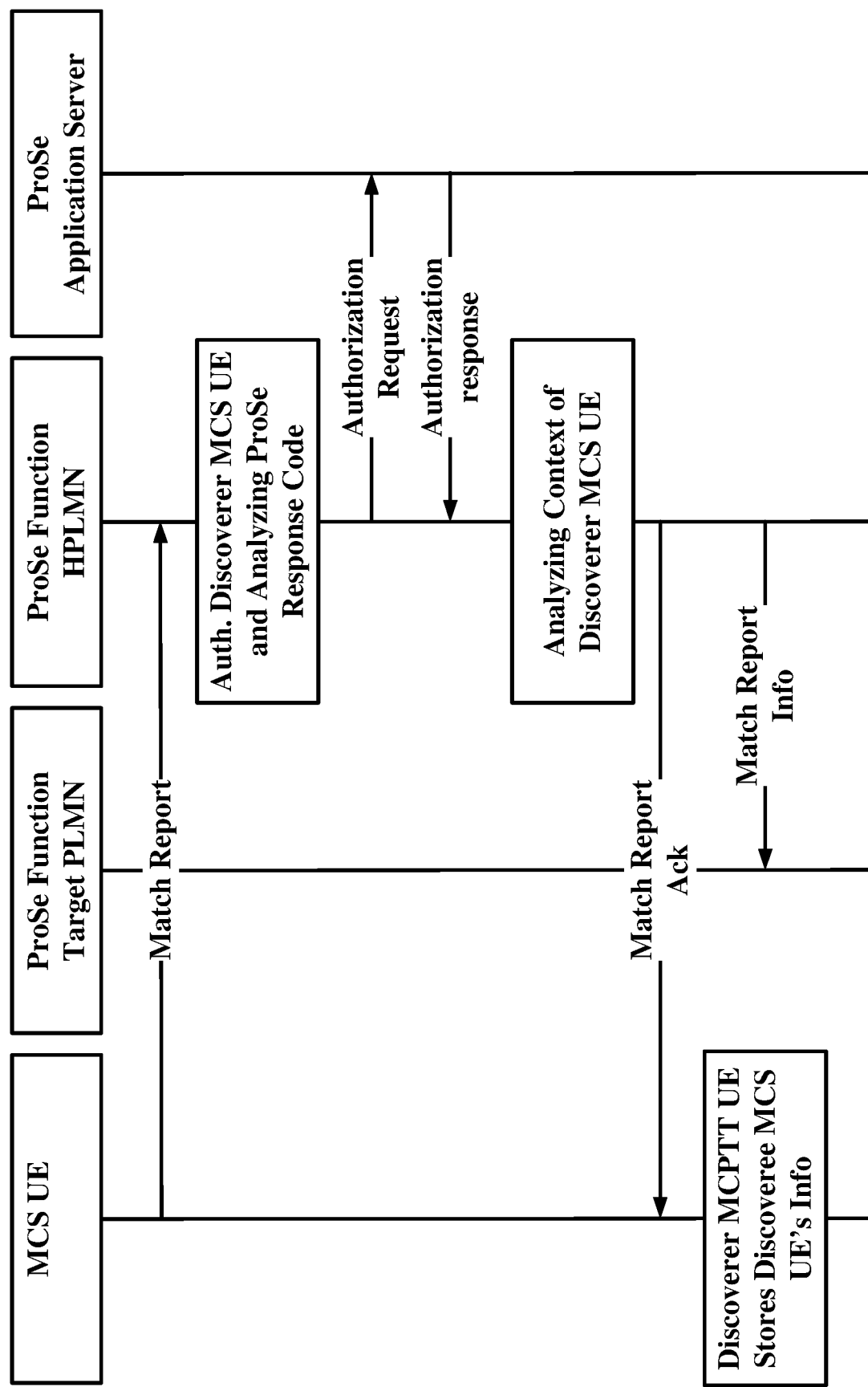
FIG. 14 is a flow diagram showing an example matched reporting procedure as per an aspect of an embodiment.

FIG. 14 is a flow diagram showing an example matched reporting procedure. An example procedure for match reporting for discoveree/discoverer is as follows:

If the discoverer MCS UE may have received over the air a ProSe response code is matching the discovery response filter obtained in the discovery response message from the HPLMN ProSe function but the discoveree MCS UE does not have an RPAUID with a valid TTL, the discoverer MCS UE may construct a match report message comprising its own RPAUID, its IMSI or MSISDN as UE Identity, discovery type set to "restricted discovery", application ID set to unique identifier for the application that triggered the monitoring request, the over the air received ProSe response code, optional metadata requested, and discoveree PLMN ID of the PLMN where the discoveree MCS UE was discovered. The discoveree MCS UE may transmit the match report message towards the HPLMN ProSe Function.

The HPLMN ProSe function may verify if the discoverer MCS UE has performed restricted discovery and may analyze Prose response code. The HPLMN ProSe function may identify the discoveree MCS UE's RPAUID in the context of the discoverer MCS UE.

If metadata requested was included to the originated match report message by the discoverer MCS UE, the HPLMN ProSe function may locate the ProSe application server from the application ID and may construct an authorization request message comprising discoverer MCS UE's RPAUID, discoveree MCS UE's RPAUID, and request type set to "restricted discovery/match". The HPLMN ProSe function may send the authorization request message towards the ProSe application server. This step is optional if metadata requested was not included into the original match report message.

The ProSe application server may construct an authorization response comprising discoverer MCS UE's PDUID, discoveree MCS UE's PDUID, response type set to "restricted discovery/match ack", and metadata corresponding to the discoveree MCS UE.

The HPLMN ProSe function may verify that the PDUID belongs to the discoverer MCS UE and the discoveree MCS UE's PDUID are the same as the discoveree MCS UE's PDUID that is stored in the context of the discoverer MCS UE.

The HPLMN ProSe function may construct a match report ack comprising application ID set to unique identifier for the application that triggered the discovery request, discoveree MCS UE's RPAUID, validity timer, and optionally meta data.

The discoverer MCS UE may store the mapping between the ProSe response code, discoveree MCS UE's PRAUID, the application ID unique identifier of the application that triggered the discovery procedure, and the related validity timer.

The HPLMN ProSe Function may construct a match report info message comprising discoverer MCS UE's RPAUID, discoveree MCS UE's RPAUID, discoveree MCS UE's Identity set to IMSI or MSISDN for charging purposes, ProSe response code, and discovery type set to "restricted discovery". The HPLMN ProSe function may send the match report info message towards the discoveree MCS UE's PLMN ProSe function and the ProSe function of the PLMN where the discoveree MCS UE may be roaming in.

Figure 15:
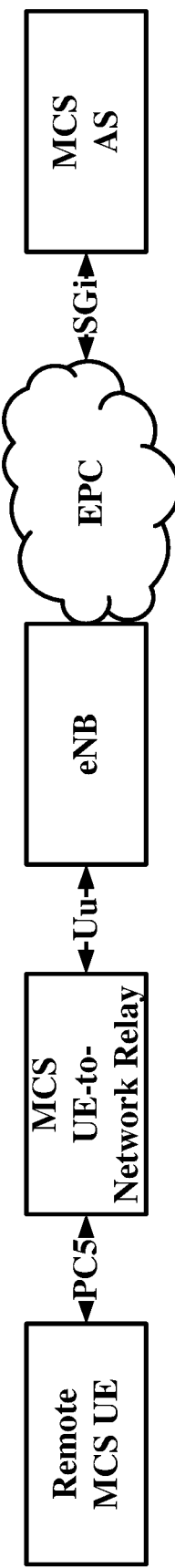
FIG. 15 is a block diagram of an example MCS UE-to-network relay as per an aspect of an embodiment.

FIG. 15 is a block diagram of an example MCS UE-to-network relay. A public safety ProSe (MCS) UE may provide the functionality to support connectivity to the network for a remote MCS UE. An MCS UE is considered to be remote if it has established a successful PC5 link connection to a UE-to-Network relay. A remote MCS UE may be out of E-UTRAN coverage. An MCS UE may be within a coverage of E-UTRAN and may choose not to use E-UTRAN coverage. At the time of discovery ProSe relay service codes for MCS services in the MCS UE-to-Network relay are recognized by the remote MCS UE to identify the MCS UE-to-Network relay. Relay service codes are pre-provisioned in the MCS UE-to-Network relay and the remote MCS UE and are communicated by discovery announcement message for Model A ProSe discovery and by discovery solicitation message/discovery response message for Model B ProSe discovery. The remote MCS UE employs the MCS UE-to-Network relay to access E-UTRAN and thereby performing IMS registration and also MCS session establishment.

The MCS UE-to-Network relay may function as a relay for unicast traffic between remote UE and the network by relaying any IP traffic to the UE. The MCS UE-to-Network relay may function as a relay for multicast broadband multicast service (MBMS) traffic using one ProSe Direct Communication.

In this context, the MCS UE may be represented by a remote MCS UE and a UE-to-Network MCS UE which have PC5 interface to each other. This may be transparent to the E-UTRAN network and/or IMS network.

To set up an on-network MCS media session, the MCS UEs may register with IP Multimedia Subsystem (IMS) network. At the time of registration to the IMS network, an MCS UE may register its supported IMS communication service it intends to use. The MCS UE may also register its supported IMS applications it intends to use at the time of IMS registration. The IMS maintain the information the UE's capabilities for the possible session setup by a third party entity or another MCS UE. A third party entity may like to get a MCS UE's capabilities from the operator's network where MCS UE has registered to, in order to e.g. provide a service or application. A third party entity may transmit a session initiation protocol (SIP) message (e.g. SIP INVITE request) to the UE to set up a session. Therefore, the network must know the MCS UE's capabilities to provide this information to the third party entity.

Figure 16:
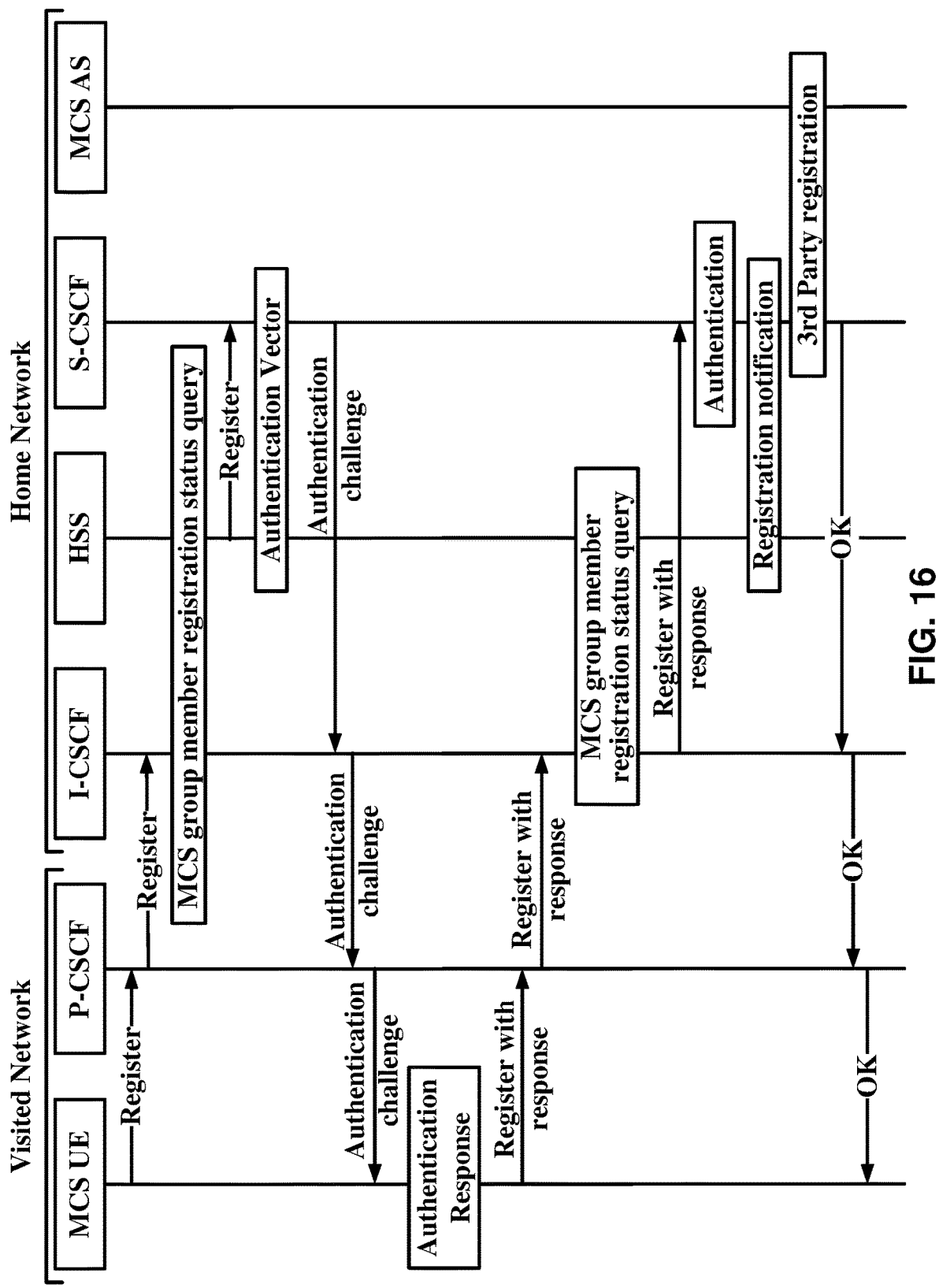
FIG. 16 is a flow diagram showing an example IMS registration procedure of an MCS UE as per an aspect of an embodiment.

FIG. 16 is a flow diagram showing an example IMS registration procedure of an MCS UE. This example flow diagram shows: MCS UE may send a SIP REGISTER request containing MCS feature tag in contact header field towards the P-CSCF in the visiting network. P-CSCF may use the MCS UE's ID to locate the I-CSCF in the home network by DNS query. I-CSCF in the home network may select suitable S-CSCF with help of HSS. S-CSCF may challenge the registration by requesting an authentication. If the authentication information is not valid, S-CSCF may get it from HSS. MCS UE may provide authentication response and may send the SIP REGISTER request containing authentication response and the MCS feature tag in the contact header towards the P-CSCF in the visiting network. P-CSCF may use the MCS UE's ID to locate the I-CSCF in the home network by DNS query. I-CSCF in the home network may select suitable S-CSCF with help of HSS. S-CSCF may authenticate the MCS UE and may send registration notification to the HSS and may receive the MCS user profile from the HSS. The MCS user profile may be used for the 3rd party register to the MCS application server (AS). S-CSCF may respond to OK to the MCS UE.

Figure 17:
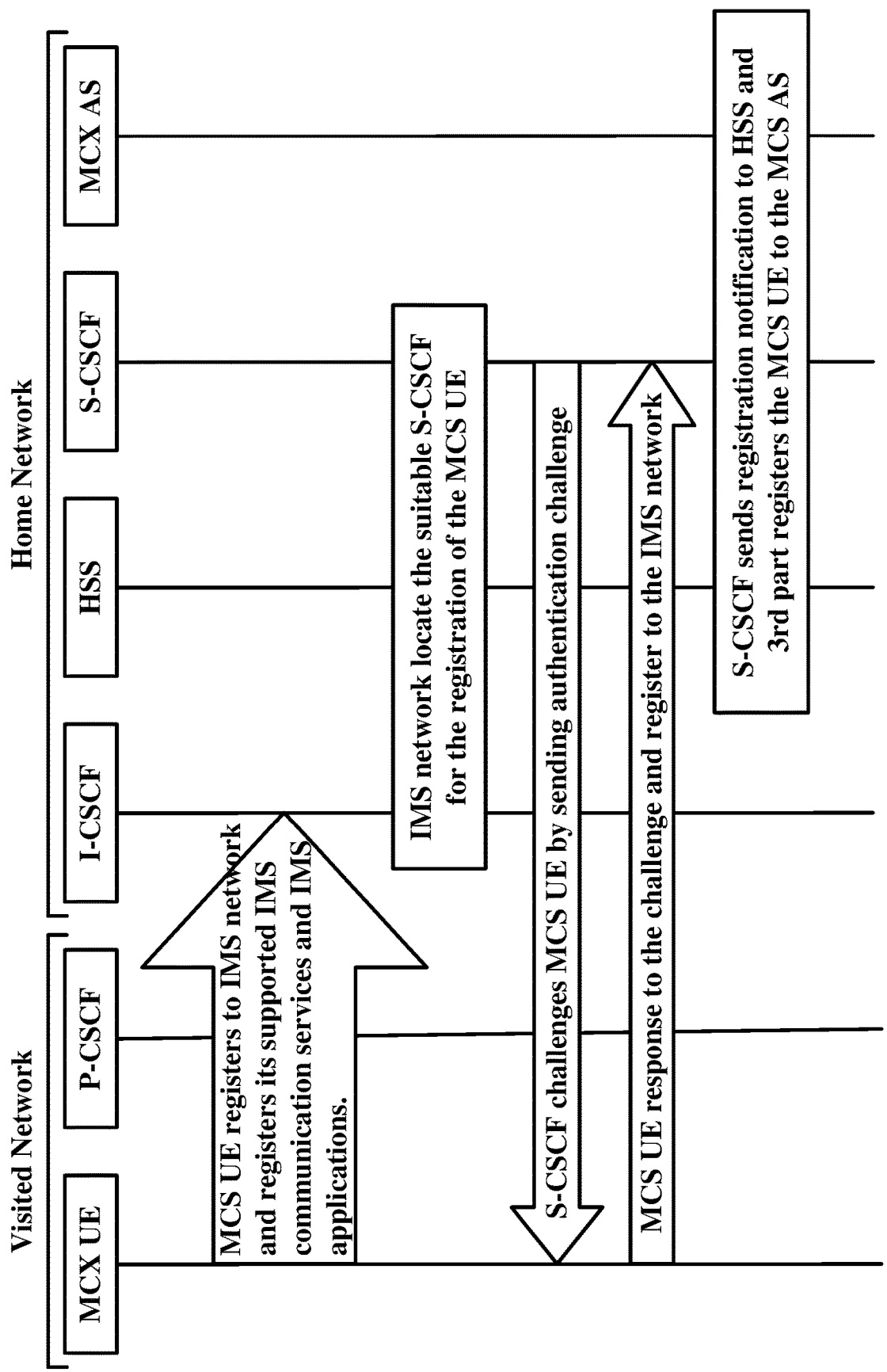
FIG. 17 is a flow diagram of an example IMS registration of an MCS UE as per an aspect of an embodiment.

FIG. 17 is a flow diagram of an example IMS registration of an MCS UE. MCS UE may register its supported IMS communication services and IMS applications, it may intent to use to its contact header field of the register message when registering to the IMS network. IMS network may locate the most suitable S-CSCF for this registration and may forward the registration request to that S-CSCF. S-CSCF may challenge the MCS UE by sending authentication request to the UE. MCS UE may respond to the authentication request. S-CSCF 3rd part may register the UE to the MCS AS.

New Dialog or Standalone Transaction: Once the MCS UEs are all registered to the IMS network and if an MCS UE may like to establish an MCS media session, the MCS UE may declare all its supported IMS communication services and all it supported IMS applications it intends to use. If this is a request for a new dialog, a SIP header field may be populated comprising a public GRUU value, a temporary GRUU value, or SIP URI containing the contact address of the MCS UE; an "ob" SIP URI parameter; an indicator for IMS communication service that the MCS UE may include in media feature tag; and an indicator for IMS application that the MCS UE may include in a media feature tag.

The MCS UE may modify the established dialog capabilities by e.g. adding a media or requesting a supplementary service if the modification is defined for the IMS communication service. If the modification is not defined for that IMS communication service, the MCS UE may initiate a new dialog.

Figure 18:
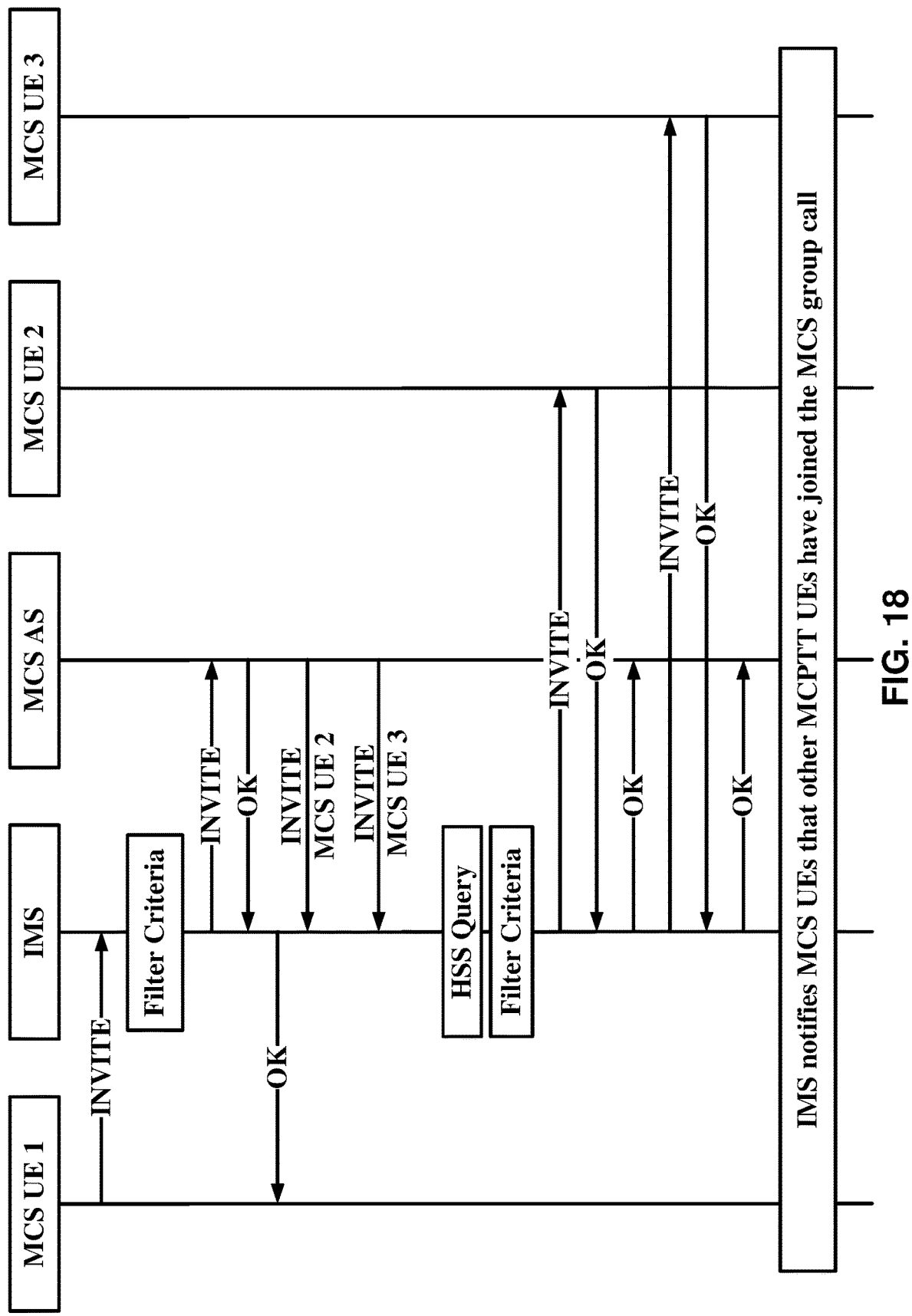
FIG. 18 is a flow diagram shows an example MCS group session setup by MCS UE as per an aspect of an embodiment.

FIG. 18 is a flow diagram shows an example MCS group session setup by MCS UE. MCS UE 1 may initiate an MCS group session with MCS UE 2 and MCS UE 3 by sending an SIP INVITE request which may comprise MCS feature tag in a SIP header field. The SIP header field may also comprise the MCS feature tag which may indicate that MCS service may be required for the MCS group session. IMS may validate the service profile of the MCS UE 1 and may evaluate the filter criteria. It may thereafter forward the invite towards MCS AS. MCS AS may accept the MCS group session and may invite MCS UE 2 and MCS UE 3 by sending an SIP INVITE request which may comprise MCS feature tag in the SIP header field. The SIP header field may also comprise the MCS feature tag which may indicate that MCS service may be required for the MCS group session. HSS may be queried to locate MCS UE 2 and MCS UE 3 and IMS may validate their service profile and may evaluate the filter criteria. MCS UE 2 and MCS UE 3 may accept the invitation for the MCS group session. IMS may notify the MCS UEs that other MCS UEs have now joined the on-network MCS group session.

Figure 19:
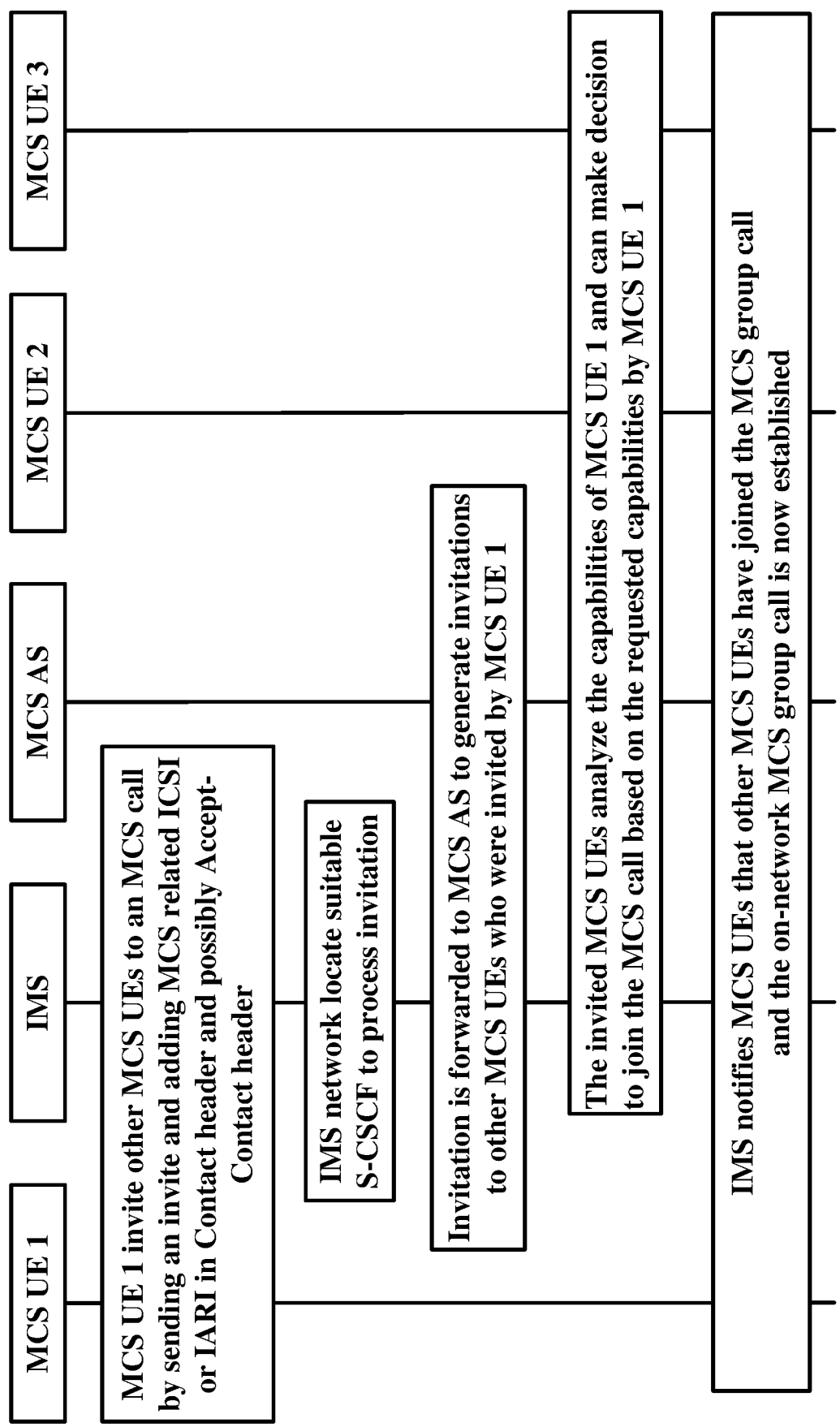
FIG. 19 is a flow diagram of an example MCS session setup by MCS UE A as per an aspect of an embodiment.

FIG. 19 is a flow diagram of an example MCS session setup by MCS UE A. MCS UE 1 may initiate an MCS session with other MCS UEs by sending an SIP INVITE request which may comprise MCS related IMS communication service and IMS application in the SIP header field. IMS may validate the service profile of the MCS UE 1 and may locate the suitable S-CSCF to process the MCS session invitation. S-CSCF may forward the invitation to the MCS AS which may generate separate invitations towards other MCS UEs who were originally invited by MCS UE 1. The invited MCS UEs may analyze the capabilities of MCS UE 1 who invited them to the MCS session and may make decision to join the MCS session based on the requested capabilities by MCS UE 1. IMS may notify MCS UEs that other MCS UEs have joined the MCS group session and the on-network MCS group session is now established.

Example embodiments of mission critical push-to-talk (MCPTT) describe mechanisms for handling group and/or organization affiliation of an MCPTT user to MCPTT groups and/or organizations. MCPTT is an example of MCS. The disclosed embodiments for MCPTT may also be implemented in PTT (push to talk) type calls. In the disclosed embodiment, PTT may be considered as an example of a MCPTT type call. A non-limiting example context in which the embodiments may be implemented is 3GPP MCPTT standards. Some or more of the features described in the standards may be implemented and some others may be optional and may not be implemented in example embodiments.

One of the more of the following features may be features for on-network and/or off-network MCPTT. An MCPTT user may be able to affiliate with a multiplicity of MCPTT groups, subject to restrictions configured by the MCPTT administrator. An MCPTT User with limited speaker resources (e.g., a handheld UE) might find that playing out concurrent received audio/data/media from multiple active MCPTT groups becomes confusing and may also cause undesired voice/data/media distortion for the receiving user. During periods of time when the MCPTT user is receiving audio from multiple MCPTT groups, which MCPTT group's audio is presented to the MCPTT user is determined by the MCPTT user's choice, the priority associated with the talker of the selected MCPTT group(s), other considerations or combinations of these. The MCPTT UE may be aware of the active groups to which the MCPTT user has affiliated or selected and the identity of the other active receiving groups is available for display on the MCPTT UE. When the receive activity from the Selected MCPTT group stops, the MCPTT UE may present the audio from the next group per the MCPTT user's choice or by other means.

The MCPTT service may provide that if there is an MCPTT emergency group call on one of the MCPTT groups that an MCPTT user is affiliated to, but that user is already in a lower priority MCPTT group call or private call (with floor control), that the MCPTT user automatically hears the MCPTT emergency group call. Depending on the MCPTT User's settings and/or the MCPTT UE capability the above feature may imply that the MCPTT user stops receiving from another MCPTT group (which may normally have a higher priority) or a private call (with floor control).

One or more of the following features may apply to on-network MCPTT. In an example, some of these features may also implemented in an off-network MCPTT. The MCPTT service may provide the user ID, associated user ID alias(es), group ID, group aliases and, if available, the identity of the mission critical organization name of the transmitting participant to the receiving MCPTT UEs unless the transmitting participant's identity is restricted. The MCPTT service may provide the user ID and/or associated aliases, the identity of the selected MCPTT group, and, if available, the identity of the mission critical organization name of the transmitting MCPTT user to MCPTT UEs that are receiving for display by each MCPTT UE.

In an example embodiment, the features may include one or more of the following. An MCPTT UE operating off the network may be capable of transmitting the user ID, alias(es), off-network MCPTT group and, if available, mission critical organization name of the user who is talking (i.e., whose UE is transmitting) to all other users in the call including MCPTT UEs operating off the network that enter the call late.

In an example road accident case, an MCPTT user may be involved in group calls from several MCPTT groups such as police department, fire department, and critical medical department. The MCPTT user may be notified if a higher priority call is held by a group that the MCPTT user is most affiliated with. For instance, if a fire fighter who is affiliated with the above three MCPTT groups at a time of the road accident, receives a call from the fire department, the fire fighter may be able to be interrupted by fire department in case of an emergency. Thus, it is necessary for the MCPTT users to be aware of other MCPTT users' identities, group identities, and organization identities.

In an example embodiment, MCPTT users within an MCPTT group call may need to be aware of the user-ID, group-ID and/or organization ID of the MCPTT user who is the current talker (e.g. the user that is talking, sending data, and/or media). During the discovery, the MCPTT user may be permitted to discover MCPTT users from the affiliated MCPTT groups. The information about the other MCPTT user ID, group ID and organization ID may not be provided from the discovery procedure. In the on-network MCPTT case, this may be resolved by network engagement in the MCPTT call setup.

In the case when an MCPTT user is engaged in several affiliated group calls in an on-network MCPTT call, the MCPTT group call administrator may handle the engagement of the MCPTT user in different affiliated MCPTT group calls. If an audio media needs to be interrupted to pass another audio media, the MCPTT group call administrator may handle that due to the e.g. agreed rules and/or policies for MCPTT affiliated group calls.

Figure 20:
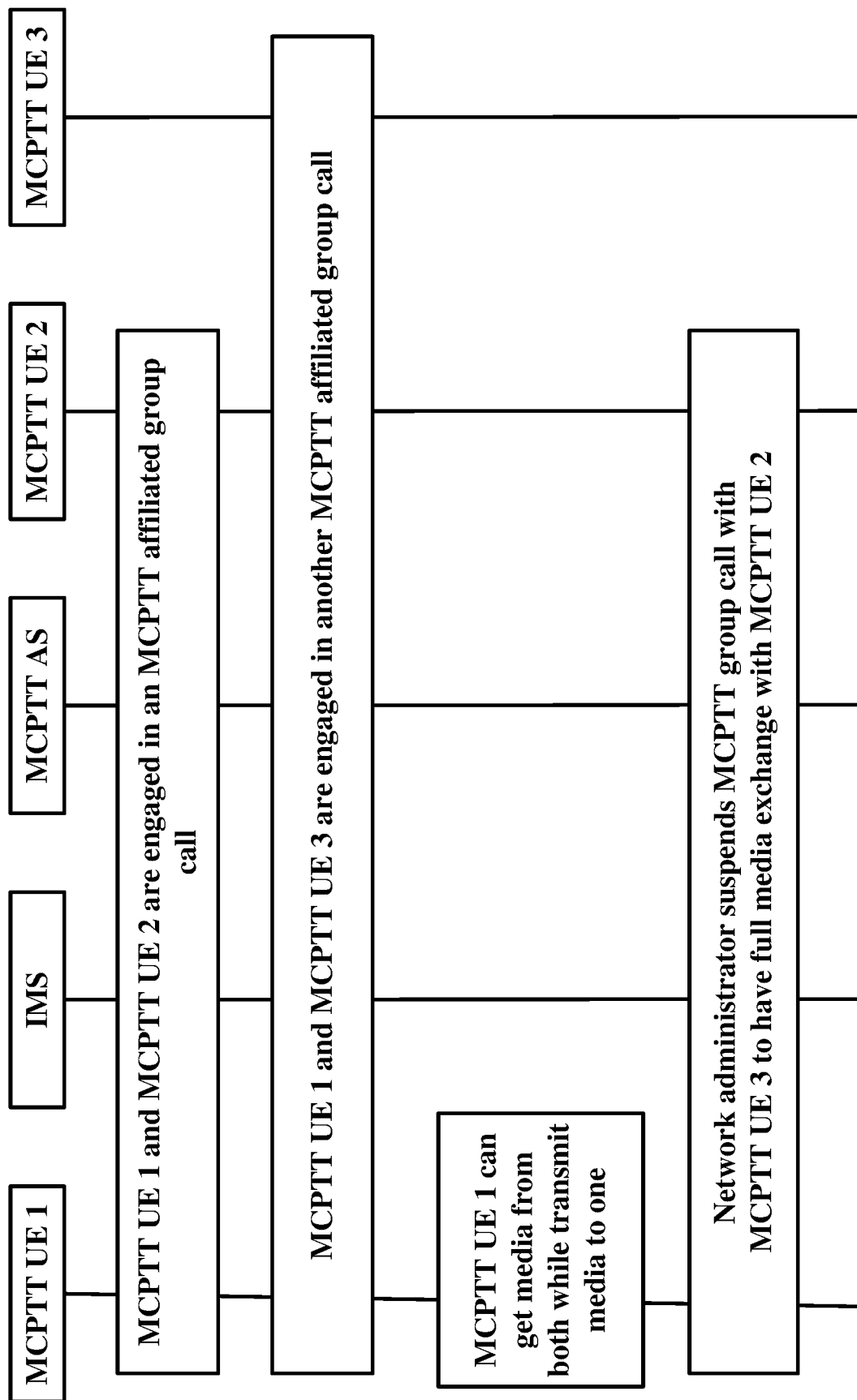
FIG. 20 is a flow diagram illustrating an example call flow as per an aspect of an embodiment.

FIG. 20 is a flow diagram illustrating an example call flow showing MCPTT UE 1 engaged in two different MCPTT affiliated group calls with MCPTT UE 2 and MCPTT UE 3. In this scenario, MCPTT UE 1 may receive media from both affiliated groups while may transmit to one. The MCPTT Service may allow an MCPTT UE to be receiving or transmitting in one MCPTT group while simultaneously receiving additional MCPTT Groups.

If the MCPTT group call administrator detects an incoming high priority MCPTT group call from MCPTT UE 2 which has close affiliation with MCPTT UE 1, network administrator may suspend the MCPTT group call. Subsequently, the MCPTT UE 1 and MCPTT UE 2 may be in a media exchange.

Example embodiments disclose a mechanism for off-network MCPTT group call set up. In the case of off-network MCPTT, there is not any network involvement in the MCPTT group calls and there is no centralized call control. The call control may be handled in the MCPTT UEs. MCPTT UEs may have capabilities to inform the MCPTT user about the MCPTT user and its affiliated MCPTT groups and organizations.

MCPTT may employ ProSe discovery mechanism. The announced Temp ID may be specific to MCPTT feature. There may be two models for discovery in ProSe discovery procedures; Model A where the announced Temp ID comprises ProSe Restricted Code and Model B where the announced Temp ID comprises ProSe Query Code or ProSe Response Code. In an example, the length of the announced Temp ID is 160 bits and it may comprise current information about the MCPTT group ID and MCPTT user ID which may be subtracted from ProSe Restricted Code, ProSe Query Code, and ProSe Response Code.

In an example embodiment, the announced Temp ID may comprise information fields about the MCPTT users. The information fields may comprise at least one of user ID, group ID, and/or organization IDs. At the time of discovery, the discoverer may locally register the information about the discoverees in terms of user ID, group ID, and organization IDs.

Figure 21:
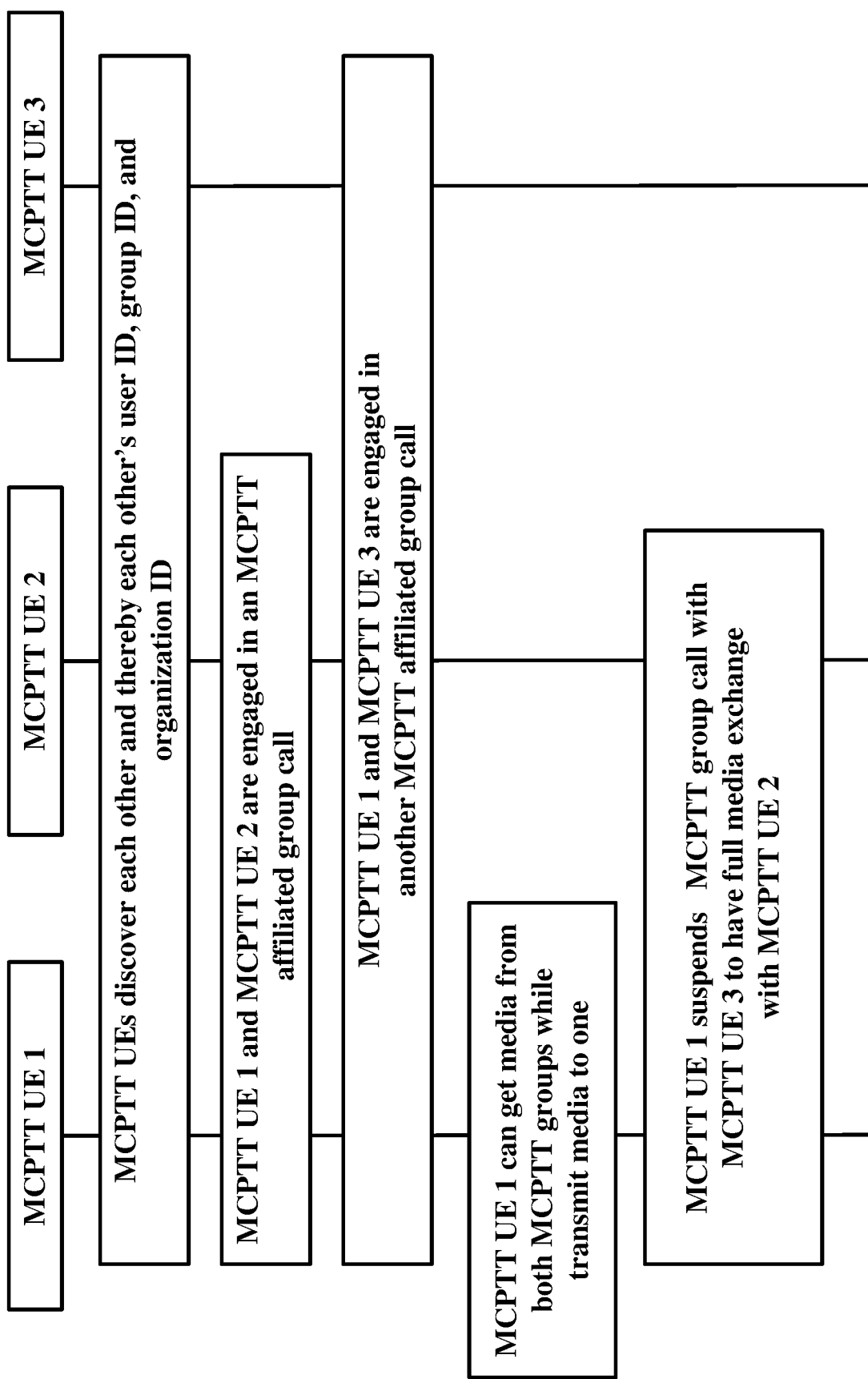
FIG. 21 is an example flow diagram as per an aspect of an embodiment.

FIG. 21 is an example flow diagram showing that MCPTT UE 1, MCPTT UE 2, and MCPTT UE 3 have discovered each other and thereby, they are aware of each other's user ID, group ID, and organization ID. MCPTT UE 1 is engaged in separate MCPTT group calls with MCPTT UE 2 and MCPTT UE 3. MCPTT UE 1 may receive media from both affiliated groups while may transmit to only one MCPTT UE. The MCPTT service may allow an MCPTT UE to receive or transmit in one MCPTT group while simultaneously receive additional MCPTT groups.

MCPTT UE 1 which has closer affiliation with MCPTT UE 2 receives indication from MCPTT UE 2 about a high priority MCPTT group call. MCPTT UE 1 suspends the other MCPTT group call. Subsequently, MCPTT UE1 and MCPTT UE 2 may exchanging media.

In an example embodiment, the organization ids may be pre-provisioned in the UEs or may be communicated to UEs via a network server such as OMA-DM, or other types of configuration/management server. In an example, the organization ids may be pre-provisioned by a ProSe function network entity (e.g. a server). The ProSe function may transmit one or more message to a UE. The one or more message may comprise the organization IDs along with other parameters.

In an example embodiment, at least one floor control message may be employed to communicate an organization ID of a user.

The floor control signaling is broadcasted within an off-network MCPTT group call, and a user who is engaged with several group calls may receive floor control messages from the other members belonging to those groups. Example embodiments enable the user to recognize a high priority call request from a specific group organization.

Figure 22:
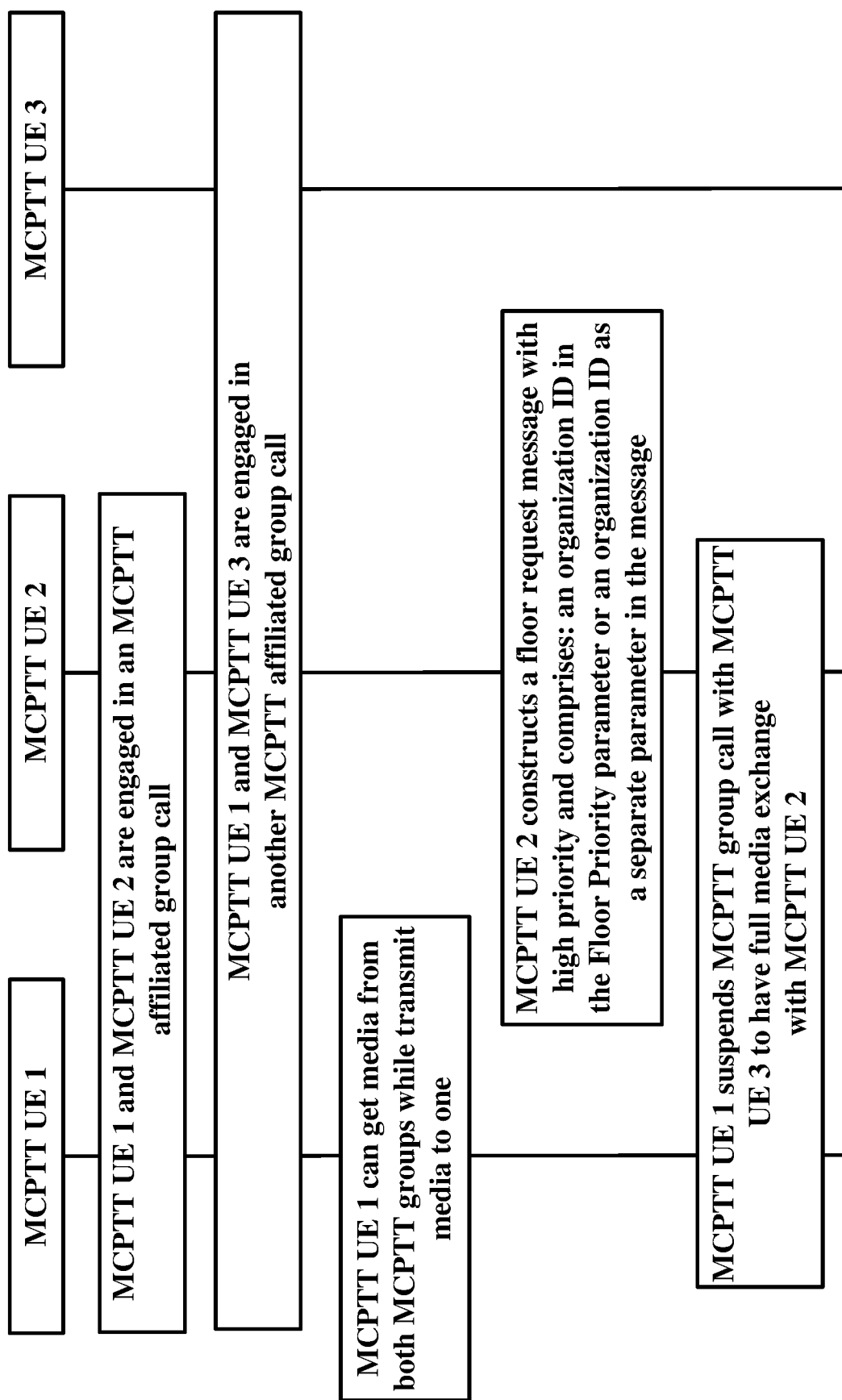
FIG. 22 is an example flow diagram showing MCPTT UE 1 engaged in separate MCPTT group calls as per an aspect of an embodiment.

In an example, the floor control message may comprise the information about the user ID, group ID, and/or organization ID that user belongs. FIG. 22 is an example flow diagram showing MCPTT UE 1 engaged in separate MCPTT group calls with MCPTT UE 2 and MCPTT UE 3. MCPTT UE 1 may receive media from both affiliated groups while may transmit to one. The MCPTT service may allow an MCPTT UE to be receiving or transmitting in one MCPTT group while simultaneously receiving additional MCPTT groups.

MCPTT UE 2 may construct a floor request message with a high priority and may target to MCPTT UE1. Upon receipt of the floor request message MCPTT UE 1 may find out about the request's priority and the MCPTT UE 2 organization from SSRC. MCPTT UE 1 has closer affiliation with MCPTT UE 2 than the one with MCPTT UE 3 and therefore suspends the MCPTT group call with MCPTT UE 3. MCPTT UE1 and MCPTT UE 2 are now exchanging media.

FIG. 23A is a diagram of an example floor control message tagged with an associated organization value. The example message may comprise the information about user ID and group ID. In an example, the following format may be implemented including e.g. an optional parameter, Organization value. FIG. 23B is a diagram of an example floor control messages comprising an optional parameter, Organization value.

Figure 24:
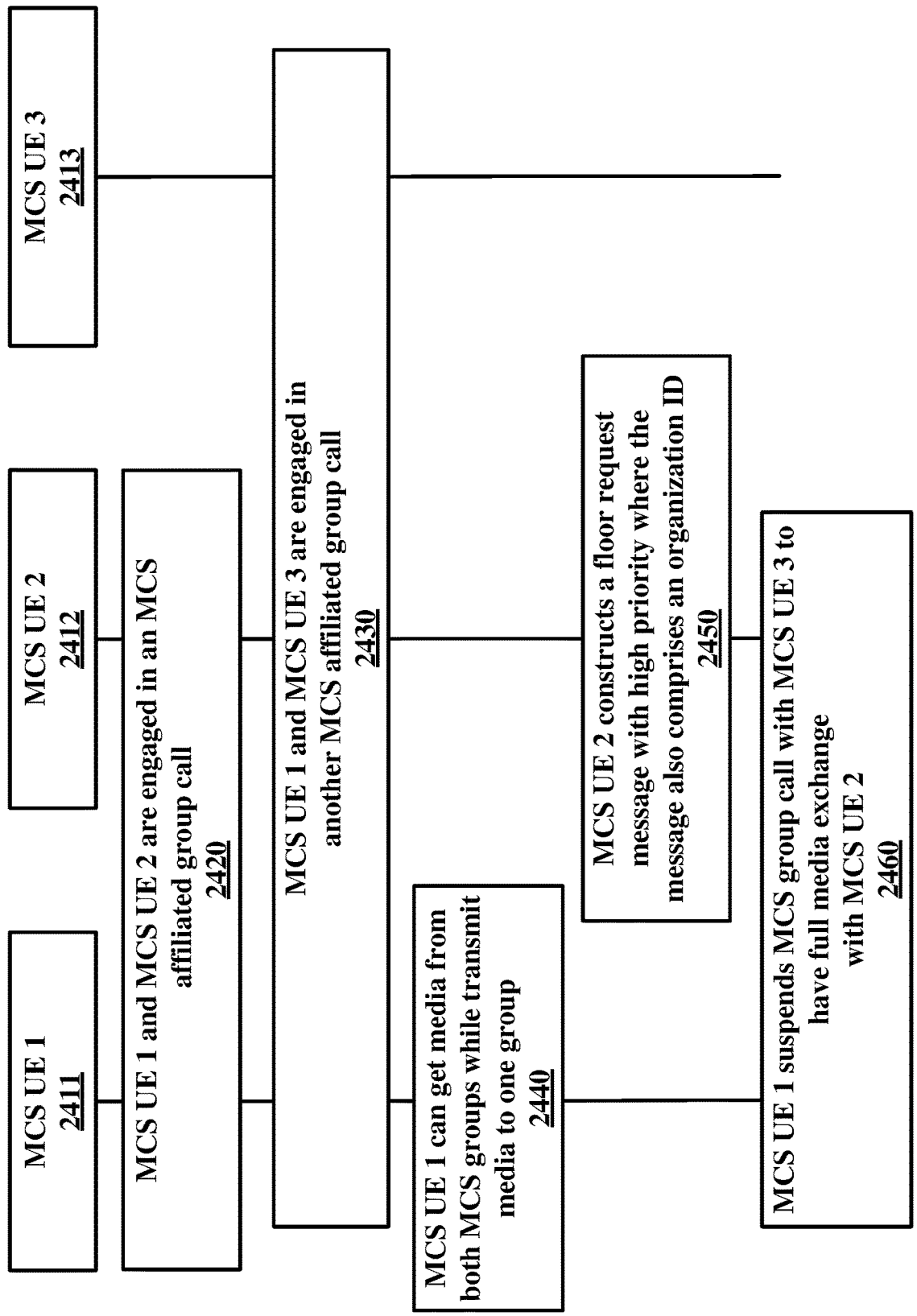
FIG. 24 is an example flow diagram showing MCPTT UE 1 engaged in separate MCPTT group calls as per an aspect of an embodiment.

FIG. 24 is an example flow diagram showing MCS UE 1 (2411) engaged in separate MCS group calls with MCS UE 2 (2412) and MCS UE 3 (2413). An MCS UE, may for example, may be a mission critical push-to-talk (MCPTT) UE. A first off-network mission critical (ONMC) wireless device may discover a plurality of ONMC wireless devices employing a proximity services (ProSe) discovery procedure. The plurality of ONMC wireless devices may comprise, as illustrated in this example, MCS UE 1 (2411), MCS UE 2 (2412), and MCS UE 3 (2413).

MCS UE 1 (2411) and MCS UE 2 (2412) may be engaged in an MCS affiliated group call at 2420. An affiliated group may comprise a group that has a connection with an organization or other body. The connection may be with a larger or more established group or organization. The connection may be with a smaller group or institution such as, for example, a subordinate part of an organization, a club, a branch organization, combinations thereof, and/or the like. An affiliated group may also comprise a group of people, institutions, etc., organized together on the basis of a common purpose or of certain shared characteristics. So, for example, MSC UE1 (2411) and MSC (2412) may both be part of an affiliated group, where MSC UE1 (2411) is part of a fire department and MSC UE2 (2412) is part of a police department affiliated with the fire department.

MCS UE 1 (2411) and MCS UE 3 (2413) may be engaged in an MCS affiliated group call at 2430. An affiliated group call may comprise a call that includes members of two or more affiliated groups, such as, for example, a police group, a firefighter group and a paramedic group. For example, the first ONMC wireless device (MSC UE 1 2411) may transmit first media traffic, employing a first mission critical session, to the third ONMC wireless device (MSC UE 3 2413). A mission critical session is a mission critical communication among one or more MSC UEs.

MCS UE 1 (2411) may get media from both MCS groups while transmitting media to one of the MCS groups at 2440. Examples of media include, but are not limited to, voice media, video media, data media, message media, combinations thereof, and/or the like. For example, a first ONMC wireless device (e.g. MCS UE 1 2411) may receive from the second ONMC wireless device (e.g. MCS UE 2 2412), a message comprising an organization field identifier and an organization ID. An organization field identifier may identify the existence of a parameter for an organization ID. An organization ID may identify, for example, a police department, a fire department, a paramedic department, a combination thereof, and/or the like.

MCS UE 2 (2412) may construct a floor request message with a high priority at 2450. A floor request may comprise a request for permission to transmit media. A high priority is a priority value that is greater than an average priority value for floor requests among the MSC UE devices of an affiliated group. The floor request message may also comprise an organization ID. An organization ID may be unique for an organization within an affiliated group.

According to an embodiment, first ONMC wireless device (e.g. MCS UE 1 2411) may determine a call priority, at least in part, based on the organization field identifier and the organization ID. MCS UE 1 (2411) may suspend an MCS group call with MCS UE 3 (2413) to have a full media exchange with MCS UE 2 (2412) at 2460. Suspending (or otherwise terminating) a call may occur to allow a higher priority call. The higher priority call may be from a closely affiliated organization. For example, transmission of the first media traffic to the third wireless device may be terminated based at least on the call priority. According to an embodiment, the first ONMC wireless device (e.g. MCS UE 1 2411) may start transmission of a second media traffic to the second ONMC wireless device (e.g. MCS UE 2 2412) employing a second mission critical session.

Although this example employs MCS UE's, embodiments are not so limited. It is envisioned that an MCS UE may be, for example, a mission critical video UE, a mission critical audio UE, a mission critical message UE, a mission critical push-to-talk (MCPTT) UE, a mission critical media UE, combinations thereof, and/or the like. So for example, when the MSC UE is a MCPTT UE, an MCPTT UE 1 (e.g. 2411) may receive media from both affiliated groups while transmitting to one affiliated group. The MCPTT service may allow an MCPTT UE to be receiving or transmitting in one MCPTT group while simultaneously receiving additional MCPTT groups. An MCPTT UE 2 (e.g. 2412) may construct a floor request message with high priority and may target MCPTT UE1 (2411). Upon receipt of the floor request message, MCPTT UE 1 (e.g. 2411) may determine the request's priority and the MCPTT UE 2 (e.g. 2412) organization identity from a floor priority parameter or another optional parameter. MCPTT UE 1 (e.g. 2411) may have a closer affiliation with MCPTT UE 2 (e.g. 2412) than the one with MCPTT UE 3 (e.g. 2413) and may suspend the MCPTT group call with MCPTT UE 3 (e.g. 2413). Subsequently, MCPTT UE1 (e.g. 2411) and MCPTT UE 2 (e.g. 2412) may exchange media.

According to various embodiments, a wireless device may comprise one or more processors and memory. The memory may store instructions that, when executed by the one or more processors, cause the device to perform a series of actions. Embodiments of example actions are illustrated in the accompanying figures and specification.

Figure 25:
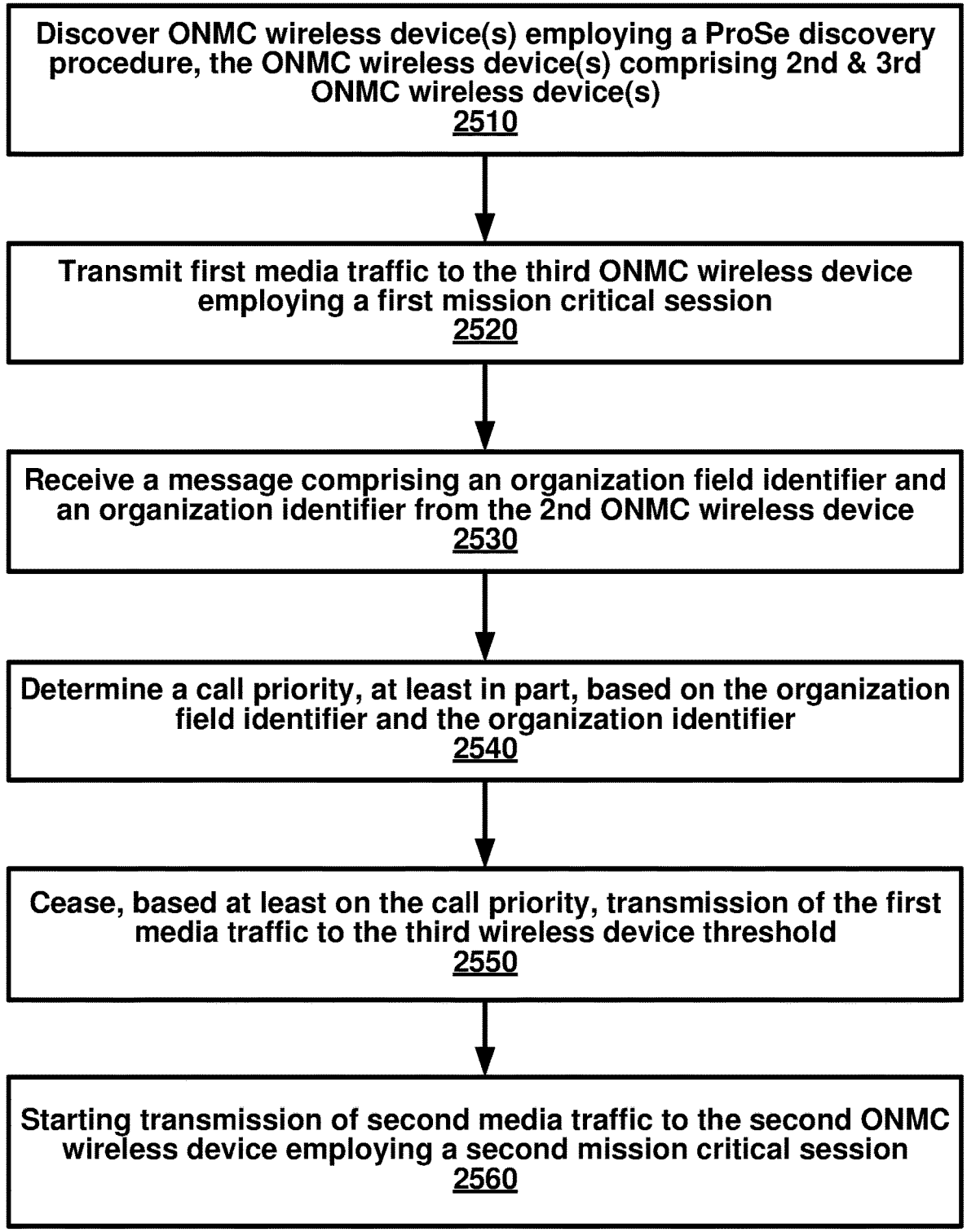
FIG. 25 is an example flow diagram as per an aspect of an embodiment of the present disclosure.

FIG. 25 is an example flow diagram as per an aspect of an embodiment of the present disclosure. At 2510, a first off-network mission critical (ONMC) wireless device may discover a plurality of ONMC wireless devices employing a proximity services (ProSe) discovery procedure. The plurality of ONMC wireless devices may comprise a second ONMC wireless device and a third ONMC wireless device. The first ONMC wireless device may be associated with, for example, a first group identified by a first group identifier. The second ONMC wireless device may be associated with, for example, a second group identified by a second group identifier. According to an embodiment, the first wireless device; the second wireless device; and the third wireless device may communicate directly with each other without any network involvement.

The first group and the second group may be affiliated groups. An affiliated group may comprise a group that has a connection with an organization or other body. The connection may be with a larger or more established group or organization. The connection may be with a smaller group or institution such as, for example, a subordinate part of an organization, a club, a branch organization, combinations thereof, and/or the like. An affiliated group may also comprise a group of people, institutions, etc., organized together on the basis of a common purpose or of certain shared characteristics.

At 2520, first media traffic may be transmitted by the first ONMC wireless device to the third ONMC wireless device employing a first mission critical session.

At 2530, a message may be received by the first ONMC wireless device from the second ONMC wireless device. The message may comprise an organization field identifier and an organization identifier. The organization field identifier and/or the organization identifier may indicate a closer affiliation between the first ONMC wireless device and the second ONMC wireless device, compared with an affiliation between the first ONMC wireless device and the third ONMC wireless device. The message may comprise, for example, a floor request message. The message may further comprise, for example, an organization length field.

At 2540, the first ONMC wireless device may determine a call priority, at least in part, based on the organization field identifier and the organization identifier. The determining the call priority may indicate, for example, that the call priority is higher than a priority of the first media traffic.

At 2550, the first ONMC wireless device may terminate transmission of the first media traffic to the third wireless device, based at least on the call priority. At 2560, the first ONMC wireless device may start transmission of second media traffic to the second ONMC wireless device employing a second mission critical session. At least one of the first media traffic and the second media traffic may comprise, for example, at least one of voice traffic, video traffic, or data traffic. According to an embodiment, the first ONMC wireless device may further receive, by from the second wireless device, a second group identifier of a second group associated with the second ONMC wireless device. According to an embodiment, the first ONMC wireless device may further receive a second-floor control message comprising a floor priority.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on mission critical services such as mission critical push-to-talk services employing media types such as audio services, video services and media services. However, one skilled in the art will recognize that embodiments of the invention may also be implemented in a system comprising other types of services such as, for example, data services, augmented reality services, data fusion services, combinations thereof, and/or the like.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
    discovering, by a first off-network wireless device, a second off-network wireless device and a third off-network wireless device;
    transmitting, by the first off-network wireless device to the third off-network wireless device, first media traffic employing a first session;
    receiving, by the first off-network wireless device from the second off-network wireless device, a floor request message comprising an organization field identifier and an organization identifier;
    determining, by the first off-network wireless device, a call priority, based on the organization field identifier and the organization identifier;
    terminating, based on the call priority, transmission of the first media traffic to the third off-network wireless device; and
    starting transmission, by the first off-network wireless device, of second media traffic to the second off-network wireless device employing a second session.

2. The method of claim 1, wherein:
    the first off-network wireless device is associated with a first group identified by a first group identifier;
    the second off-network wireless device is associated with a second group identified by a second group identifier; and
    the first group and the second group are affiliated groups.

3. The method of claim 1, further comprising receiving, from the second off-network wireless device, a second group identifier of a second group associated with the second off-network wireless device.

4. The method of claim 1, wherein the determining the call priority indicates that the call priority is higher than a priority of the first media traffic.

5. The method of claim 1, wherein the organization field identifier and the organization identifier indicate a closer affiliation between the first off-network wireless device and the second off-network wireless device, compared with an affiliation between the first off-network wireless device and the third off-network wireless device.

6. The method of claim 1, wherein at least one of the first media traffic and the second media traffic comprises at least one of voice traffic, video traffic, or data traffic.

7. The method of claim 1, wherein the organization identifier is an optional parameter in the floor request message.

8. The method of claim 1, wherein the following communicate directly with each other without any network involvement: the first off-network wireless device; the second off-network wireless device; and the third off-network wireless device.

9. The method of claim 1, wherein the floor request message further comprises an organization length field.

10. The method of claim 1, further comprising receiving a second-floor control message comprising a floor priority.

11. A first off-network wireless device comprising:
    one or more processors; and
    memory storing instructions that, when executed by the one or more processors, cause the first off-network wireless device to:
        discover a second off-network wireless device and a third off-network wireless device;
        transmit to the third off-network wireless device, first media traffic employing a first session;
        receive from the second off-network wireless device, a floor request message comprising an organization field identifier and an organization identifier;
        determine a call priority, based on the organization field identifier and the organization identifier;
        terminate, based on the call priority, transmission of the first media traffic to the third off-network wireless device; and
        start transmission of second media traffic to the second off-network wireless device employing a second session.

12. The first off-network wireless device of claim 11, wherein:
    the first off-network wireless device is associated with a first group identified by a first group identifier;
    the second off-network wireless device is associated with a second group identified by a second group identifier; and
    the first group and the second group are affiliated groups.

13. The first off-network wireless device of claim 11, wherein the instructions, when executed by the one or more processors, further cause the first off-network wireless device to receive from the second off-network wireless device, a second group identifier of a second group associated with the second off-network wireless device.

14. The first off-network wireless device of claim 11, wherein the call priority indicates that the call priority is higher than a priority of the first media traffic.

15. The first off-network wireless device of claim 11, wherein the organization field identifier and the organization identifier indicate a closer affiliation between the first off-network wireless device and the second off-network wireless device, compared with an affiliation between the first off-network wireless device and the third off-network wireless device.

16. The first off-network wireless device of claim 11, wherein at least one of the first media traffic and the second media traffic comprises at least one of voice traffic, video traffic, or data traffic.

17. The first off-network wireless device of claim 11, wherein the organization identifier is an optional parameter in the floor request message.

18. The first off-network wireless device of claim 11, wherein the following communicate directly with each other without any network involvement: the first off-network wireless device; the second off-network wireless device; and the third off-network wireless device.

19. The first off-network wireless device of claim 11, wherein the floor request message further comprises an organization length field.

20. The first off-network wireless device of claim 11, wherein the instructions, when executed by the one or more processors, further cause the first off-network wireless device to receive a second-floor control message comprising a floor priority.

* * * * *

UNITED STATES PATENT AND TRADEMARK OFFICE
CERTIFICATE OF CORRECTION

PATENT NO. : 10,532,739 B2  
APPLICATION NO. : 16/386566  
DATED : January 14, 2020  
INVENTOR(S) : Roozbeh Atarius and Esmael Hejazi Dinan Page 1 of 1

It is certified that error appears in the above-identified patent and that said Letters Patent is hereby corrected as shown below:

On the Title Page

In item (63), replace "Continuation of application No. 15/403,745, filed on Jan. 11, 2017, now Pat. No. 10,071,733" with --Continuation of application No. 15/430,745, filed Feb. 13, 2017, now Pat. No. 10,271,370--.

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*